United States Patent
Shimizu

(10) Patent No.: US 12,293,453 B2
(45) Date of Patent: May 6, 2025

(54) INFORMATION PROCESSING APPARATUS, INFORMATION PROCESSING METHOD, AND DISPLAY APPARATUS FOR PERFORMING A COLLISION AVOIDANCE PROCESS FOR AVOIDING A COLLISION OF A VIRTUAL CAMERA AGAINST A TARGET OBJECT

(71) Applicant: SONY GROUP CORPORATION, Tokyo (JP)

(72) Inventor: Takayoshi Shimizu, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 243 days.

(21) Appl. No.: 17/916,397

(22) PCT Filed: Apr. 27, 2021

(86) PCT No.: PCT/JP2021/016797
§ 371 (c)(1),
(2) Date: Sep. 30, 2022

(87) PCT Pub. No.: WO2021/230073
PCT Pub. Date: Nov. 18, 2021

(65) Prior Publication Data
US 2023/0154106 A1    May 18, 2023

(30) Foreign Application Priority Data

May 13, 2020   (JP) .................................. 2020-084404

(51) Int. Cl.
*G06T 17/00*   (2006.01)
*G06F 3/14*    (2006.01)
(Continued)

(52) U.S. Cl.
CPC ................ *G06T 17/00* (2013.01); *G06F 3/14* (2013.01); *G06T 7/20* (2013.01); *G06V 10/761* (2022.01)

(58) Field of Classification Search
None
See application file for complete search history.

(56) References Cited

U.S. PATENT DOCUMENTS 6,226,008 B1 * 5/2001 Watanabe ............... G06T 15/20
                                                          345/427
2002/0158873 A1 * 10/2002 Williamson .............. G06T 7/85
                                                          345/427
(Continued)

FOREIGN PATENT DOCUMENTS

JP     2004-329463 A    11/2004
JP     2017-211912 A    11/2017
(Continued)

OTHER PUBLICATIONS

Stop the Camera, Put in a Bleep! "Not for Broadcast" the Workplace Simulator Indie Game Where You Struggle as a News Program Switcher to keep a Nationwide Broadcast from Falling Apart, Famitsu.com, Nov. 13, 2019, retrieved from Internet: https://www.famitsu.com/news/201911/13186835.html (see International Search Report below for concise relevance).

(Continued)

*Primary Examiner* — Jason A Pringle-Parker
(74) *Attorney, Agent, or Firm* — Paratus Law Group, PLLC

(57) ABSTRACT

An information processing apparatus according to an embodiment of the present technology includes an image capture control unit. The image capture control unit performs, depending on a positional relationship between a target object that moves in a virtual space and a virtual camera that moves in the virtual space and captures an image (Continued)

of a target object, a collision avoidance process for avoiding a collision of the virtual camera against the target object.

17 Claims, 11 Drawing Sheets

(51) Int. Cl.
  *G06T 7/20* (2017.01)
  *G06V 10/74* (2022.01)

(56) References Cited

U.S. PATENT DOCUMENTS

| | | | |
|---|---|---|---|
| 2004/0224761 A1 | 11/2004 | Nishimura | |
| 2009/0092286 A1* | 4/2009 | Saneshige | G06T 19/006 382/103 |
| 2010/0060661 A1* | 3/2010 | Avent | A63F 13/10 345/619 |
| 2011/0102424 A1* | 5/2011 | Hibbert | G06T 15/02 345/419 |
| 2012/0127170 A1* | 5/2012 | Varadhan | G06T 19/00 345/419 |
| 2013/0225289 A1* | 8/2013 | Yoshimitsu | A63F 13/00 463/31 |
| 2014/0354687 A1* | 12/2014 | Kiuchi | A63F 13/525 345/633 |
| 2017/0113138 A1* | 4/2017 | Makino | G06T 19/003 |
| 2018/0197334 A1* | 7/2018 | Kitazono | A63F 13/56 |
| 2018/0276874 A1* | 9/2018 | Myhill | G06T 15/20 |
| 2019/0070505 A1* | 3/2019 | Ratelle | A63F 13/57 |
| 2019/0244419 A1* | 8/2019 | Bell | G06T 17/00 |
| 2019/0287302 A1 | 9/2019 | Bhuruth | |
| 2019/0356906 A1* | 11/2019 | Handa | H04N 13/117 |
| 2021/0241518 A1* | 8/2021 | Tong | H04N 23/60 |
| 2022/0295034 A1* | 9/2022 | Bouazizi | H04N 21/21805 |

FOREIGN PATENT DOCUMENTS

| | | |
|---|---|---|
| JP | 6276882 B1 | 2/2018 |
| JP | 2018-171309 A | 11/2018 |
| JP | 6556301 B1 | 8/2019 |
| JP | 2019-160318 A | 9/2019 |

OTHER PUBLICATIONS

Jun. 15, 2021, International Search Report issued for related PCT application No. PCT/JP2021/016797.
Anonymous: "Cinemachine Collider", Unity Manual, Mar. 7, 2020 (Mar. 7, 2020), XP093050075, Retrieved from the Internet: URL:https://web.archive.org/web/20200307183114/https://docs.unity3d.com/Packages/com.unity.cinemachine@2.3/manual/CinemachineCollider.html [retrieved on May 26, 2023] * the whole document *.

* cited by examiner

INFORMATION PROCESSING APPARATUS, INFORMATION PROCESSING METHOD, AND DISPLAY APPARATUS FOR PERFORMING A COLLISION AVOIDANCE PROCESS FOR AVOIDING A COLLISION OF A VIRTUAL CAMERA AGAINST A TARGET OBJECT

CROSS REFERENCE TO PRIOR APPLICATION

This application is a National Stage Patent Application of PCT International Patent Application No. PCT/JP2021/016797 (filed on Apr. 27, 2021) under 35 U.S.C. § 371, which claims priority to Japanese Patent Application No. 2020-084404 (filed on May 13, 2020), which are all hereby incorporated by reference in their entirety.

TECHNICAL FIELD

The present technology relates to an information processing apparatus, an information processing method, and a display apparatus that can be applied to image display of a virtual space.

BACKGROUND ART

Patent Literature 1 has described a content streaming server that streams live content using virtual characters. In this server, a virtual character that moves depending on a streamer's motion is arranged in a virtual space, and a video in the virtual space is captured from a viewpoint of a virtual camera. An image capture position or the like of the virtual camera is controlled in accordance with an instruction from a viewer joining as a cameraman. The video captured by the virtual camera is streamed to the viewer's terminal as live content (paragraphs [0018], [0038], and [0045] in specification, FIG. 1, and the like in Patent Literature 1).

CITATION LIST

Patent Literature

Patent Literature 1: Japanese Patent No. 6556301

DISCLOSURE OF INVENTION

Technical Problem

A technology of streaming live content or the like using a virtual space is expected to be applied in various fields such as entertainment and education, and it is desirable to provide a technology of properly capturing an image of a target in a virtual space.

In view of the above-mentioned circumstances, it is an object of the present technology to provide an information processing apparatus, an information processing method, and a display apparatus that are capable of properly capturing an image of a target in a virtual space.

Solution to Problem

In order to accomplish the above-mentioned object, an information processing apparatus according to an embodiment of the present technology includes an image capture control unit.

The image capture control unit performs, depending on a positional relationship between a target object that moves in a virtual space and a virtual camera that moves in the virtual space and captures an image of a target object, a collision avoidance process for avoiding a collision of the virtual camera against the target object.

In this information processing apparatus, the collision avoidance process depending on the positional relationship between the target object in the virtual space and the virtual camera that captures an image of the target object while moving in the virtual space is performed. Accordingly, a collision between the target object and the virtual camera is previously avoided, and it becomes possible to properly capture an image of the target in the virtual space.

The image capture control unit may detect, on the basis of the positional relationship between the target object and the virtual camera, a proximity state of the target object and the virtual camera, and perform the collision avoidance process in a case where the proximity state has been detected.

The image capture control unit may detect a state in which a relative distance between the target object and the virtual camera is equal to or smaller than the predetermined threshold as the proximity state.

The relative distance may include a current value or a predicted value.

The virtual camera may image the target object along a preset image capture path. In this case, the image capture control unit may change, in a case where the proximity state has been detected, the image capture path as the collision avoidance process.

The image capture path may be a path set so that the virtual camera passes through a plurality of relay points in order.

The image capture control unit may change, in a case where the proximity state has been detected, a relay point that is a movement destination of the virtual camera so that a collision between the target object and the virtual camera is avoided.

The image capture control unit may set the movement destination of the virtual camera to be a relay point smallest in the order that enables a collision between the target object and the virtual camera to be avoided.

The image capture control unit may change, in a case where the proximity state has been detected, at least a part of a path up to the relay point that is the movement destination of the virtual camera so that a collision between the target object and the virtual camera is avoided.

The image capture control unit may move the virtual camera along an alternative path to make a detour around the target object from the point at which the proximity state has been detected.

The alternative path may be a path that keeps the relative distance between the target object and the virtual camera constant.

The image capture path may be a path to which a time of passage of the virtual camera is set for each of the plurality of relay points. In this case, the image capture control unit may adjust, on the basis of the time of passage set for the relay point, a movement velocity of the virtual camera that moves the changed image capture path.

The plurality of relay points may include at least one key relay point. In this case, the image capture control unit may adjust the movement velocity of the virtual camera in a manner that depends on a time of passage through the key relay point included in the changed image capture path.

The image capture control unit may switch, in a case where the proximity state has been detected, a display image for displaying the target object from the image captured by the virtual camera to an image captured by another virtual camera as the collision avoidance process.

The image capture control unit may move the virtual camera so that the relative distance between the target object and the virtual camera is constant as the collision avoidance process.

The image capture control unit may retard a timing of velocity change of the virtual camera with respect to a timing of velocity change of the target object so that the relative distance falls within a predetermined range.

The target object may include a three-dimensional actually photographed model of a performer.

The image capture control unit may stream the image captured by the virtual camera in real time.

An information processing method according to an embodiment of the present technology is an information processing method performed by a computer system and includes performing, depending on a positional relationship between a target object that moves in a virtual space and a virtual camera that moves in the virtual space and captures an image of a target object, a collision avoidance process for avoiding a collision of the virtual camera against the target object.

A display apparatus according to an embodiment of the present technology includes an image acquiring unit and a display unit.

The image acquiring unit acquires an image captured by a virtual camera that operates in accordance with a collision avoidance process for avoiding a collision of the virtual camera against a target object, the collision avoidance process being performed depending on a positional relationship between the target object that moves in a virtual space and the virtual camera that moves in the virtual space and captures an image of the target object.

The display unit displays the image captured by the virtual camera.

MODE(S) FOR CARRYING OUT THE INVENTION

Hereinafter, embodiments according to the present technology will be described with reference to the drawings.

[Overview of Streaming System]

Figure 1:
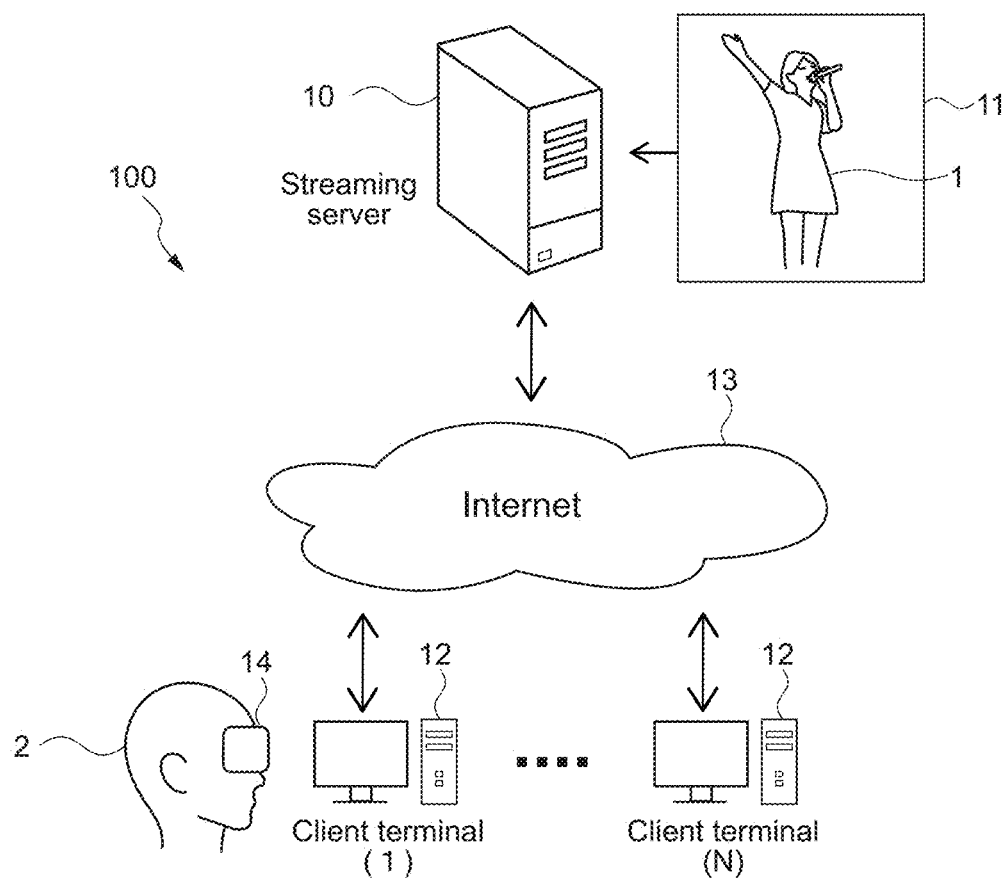
FIG. 1 A schematic view showing a configuration example of a streaming system according to an embodiment of the present technology.

FIG. 1 is a schematic view showing a configuration example of a streaming system according to an embodiment of the present technology. A streaming system 100 is a system that streams live content using a virtual space in real time.

The streaming system 100 includes a streaming server 10, an image capture system 11, and at least one client terminal 12. In the configuration shown in FIG. 1, the streaming server 10 and each client terminal 12 are connected to be capable of communicating with each other via the Internet 13. It should be noted that the streaming server 10 and each client terminal 12 may be connected via a dedicated network such as a private network.

Hereinafter, an overview of the streaming system 100 will be described showing a case where a music live concert or the like takes place in a virtual space as an example.

The streaming server 10 generates live content using a virtual space and streams the generated live content to each client terminal 12 via the Internet 13. That is, the streaming server 10 provides a streaming service of the live content.

In the virtual space, for example, computer graphics (CG) objects of a virtual model that a performer 1 who a main performer of the live content, a stage set, scenery, and the like are arranged. The performer 1 operates his or her own virtual model to thereby be able to give various types of performance such as singing, dancing, and playing an instrument in the virtual space.

The streaming server 10 configures such a virtual space and generates an image capturing the virtual space, sound of the virtual space, and data and the like relating to virtual objects (virtual model of the performer 1, other objects, and the like) to be arranged in the virtual space as the live content.

It should be noted that in the present disclosure, the image includes a still image and a moving image. Hereinafter, a moving image (video) capturing mainly the virtual space is used as the live content.

The image capture system 11 is a system that generates data required for generating the virtual model of the performer 1 by imaging/sensing the performer 1. In the streaming system 100, the streaming server 10 generates the virtual model of the performer 1 on the basis of the data generated by the image capture system 11 (see FIG. 5). The virtual model of the performer 1 is an example of a target object that is an image capture target of a virtual camera to be described later.

In the present embodiment, a three-dimensional actually photographed model (volumetric model) of the performer 1 is used as the virtual model (target object) of the performer 1. The volumetric model is a virtual model reproducing the performer 1 in the real space as three-dimensional CG as it is. The use of the volumetric model can reproduce the performance of the performer 1 in the real space in the virtual space as it is. Moreover, the virtual model of the performer 1 may be generated as a stereo imaging object captured from different right and left viewpoints. Accordingly, it becomes possible to stereoscopically perceive the performer 1 in the real space.

The client terminal 12 is a terminal device that a viewer 2 who uses the streaming service of the live content uses. The client terminal 12 reproduces the video, sound, and the like of the virtual space on the basis of the live content streamed from the streaming server 10.

For example, a device including a head mounted display (HMD) 14 is used as the client terminal 12. The use of the HMD 14 can display the video and the like of the virtual space to cover the field of view of the viewer 2. In addition, a device including a wearable AR glasses (see-through HMD) or a stationary display, a portable terminal device such as a tablet and a smartphone, or the like may be used as the client terminal 12.

Moreover, the client terminal 12 includes a motion sensor that detects a motion of the viewer 2, a microphone that detects voice of the viewer 2, an input device such as a keyboard that receives a character input made by the viewer 2, and the like. The data input via the input device is sent to the streaming server 10.

In the streaming server 10, live content that reflects the motion, the voice, the character input, and the like of the viewer 2 is generated on the basis of the data sent from each client terminal 12. Accordingly, viewers can join the live concert of the performer 1 that takes place in the virtual space.

Figure 2:
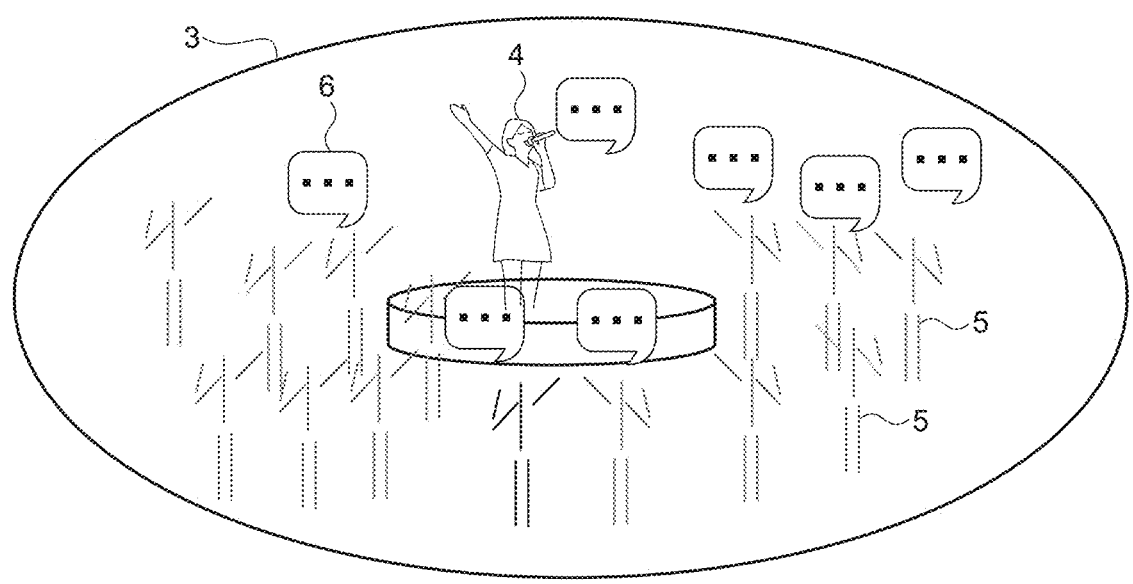
FIG. 2 A schematic view showing an example of a virtual space configured by the streaming system.

FIG. 2 is a schematic view showing an example of the virtual space configured by the streaming system 100. It can be said that a virtual space 3 is a shared space that a plurality of viewers 2 shares during their virtual experience.

A performer model 4 that is the virtual model of the performer 1 is arranged in the virtual space 3. As described above, the performer model 4 is a volumetric model reproducing the performer 1 in the real space, and moves in a similar way to the motion of the performer 1. In the example shown in FIG. 2, the performer model 4 arranged on a stage in the virtual space 3 is schematically shown.

Further, viewer models 5 that are the virtual models of the viewers 2 are arranged in the virtual space 3. The viewer models 5 are, for example, virtual avatars that move depending on motions of the viewers 2 that have been detected by motion sensors provided in the client terminals 12. In the example shown in FIG. 2, the plurality of viewer models 5 arranged to surround the stage is schematically shown.

Further, voice, comments, and the like of the performer 1 and the viewer 2 are shared in the virtual space 3. FIG. 2 schematically shows icons 6 representing the voice and comments. For example, an icon 6 including comments that the performer 1 or the viewer 2 has inputted is arranged corresponding to the virtual model of that person so that who has inputted the comments is recognizable. Alternatively, in a case where the performer 1 or the viewer 2 has said something, the icon 6 may be arranged so that the speaker can be known.

For example, the client terminal 12 of the viewer 2 joining the live concert in the virtual space 3 using the viewer model 5 displays a video (field-of-view video) corresponding to the field of view of the viewer model 5 in the virtual space 3. Accordingly, it becomes possible to provide virtual experience with a sense of presence as if the viewer 2 him or herself existed at the live concert revenue in the virtual space 3.

In addition, in the streaming system 100, the streaming server 10 generates a video capturing the virtual space 3 from the viewpoint of the virtual camera and streams the video as the live content.

Hereinafter, the video captured by the virtual camera (video captured from the viewpoint of the virtual camera) will be referred to as a video of the virtual camera. The video of the virtual camera is a video different from the above-mentioned field-of-view video.

[Video of Virtual Camera]

Figure 3:
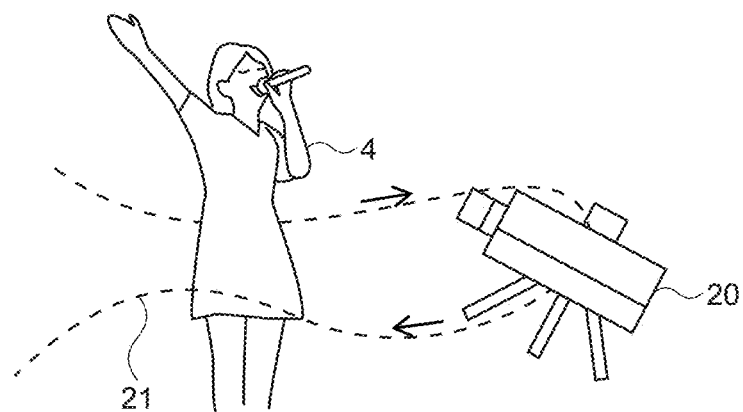
FIG. 3 A schematic view for describing image capture of a virtual camera.
Figure 4:
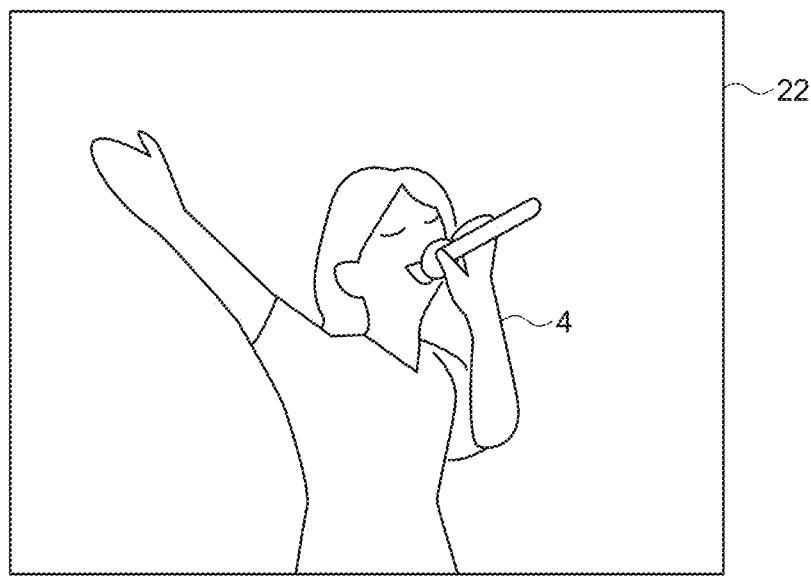
FIG. 4 A schematic view showing an example of a video of the virtual camera.

FIG. 3 is a schematic view for describing image capture by the virtual camera. FIG. 4 is a schematic view showing an example of the video of the virtual camera.

A virtual camera 20 is a camera virtually configured to move in the virtual space 3 and image the virtual space 3. Image capture position and image capture direction of the virtual camera 20 can be freely set in the virtual space 3.

FIG. 3 schematically shows the virtual camera 20 that captures an image of the virtual space 3 and an image capture path 21 (dashed line in the figure) of the virtual camera 20. It should be noted that when the virtual space 3 is actually configured, objects representing the virtual camera 20 and the image capture path 21 are not displayed.

The image capture target of the virtual camera 20 is the performer model 4 that moves in the virtual space 3. It can be thus said that the virtual camera 20 is a camera that moves in the virtual space 3 and captures an image of the performer model 4. In the example shown in FIG. 3, the virtual camera 20 moves along the image capture path 21 extending the front from the left rear of the performer model 4. At this time, image capture direction and image capture scale of the virtual camera 20 are controlled as appropriate so that the performer model 4 falls within an image capture range of the virtual camera 20.

For example, as shown in FIG. 3, when the virtual camera 20 passes through the front of the performer model 4, a virtual camera video 22 capturing the performer model 4 from the front is generated as shown in FIG. 4.

In this manner, the virtual camera video 22 is a video obtained by changing the image capture position and image capture direction in the virtual space 3 over time and capturing an image of the performer model 4.

In the image capture with the virtual camera 20, there are few limitations on the image capture position, image capture direction, and the like. Therefore, for example, it becomes possible to easily realize camera work and the like that would be difficult in image capture in the real space. As a result, it becomes possible to easily realize a dynamic visual expression.

Moreover, in the present embodiment, an image of the performer model 4 (virtual camera video 22) captured by the virtual camera 20 is streamed as the live content. Accordingly, each viewer 2 can enjoy the music live concert or the like that takes place in the virtual space 3 in real time.

In such live streaming, for example, in a case where a close-up shot is taken by moving the virtual camera 20 in proximity to the performer model 4, there is a possibility that the performer model 4 and the virtual camera 20 collide with each other if a camera path (image capture path 21) of the virtual camera 20 is a fixed route. For example, in a case where the performer model 4 (performer 1) makes a motion greater than planned, it is conceivable that the performer model 4 and the virtual camera 20 collide with each other. In this case, there is a fear that a "sinking video" or a "penetrating video" into/through the performer model 4 is live-streamed as the virtual camera video 22.

In the present embodiment, a positional relationship between the performer model 4 and the virtual camera 20 is monitored. Then, a collision avoidance process for avoiding a collision of the virtual camera 20 against the performer model 4 is performed depending on the positional relationship between the performer model 4 and the virtual camera 20.

The collision avoidance process is typically a process of controlling the behavior of the virtual camera 20 to cause the virtual camera 20 to perform an action (collision avoidance action) of avoiding a collision with the performer model 4.

Accordingly, the situation where the virtual camera 20 collides against the performer model 4 is previously avoided, and images of the performer model 4 are properly captured without producing the "sinking video" or the "penetrating video" for example. The collision avoidance process will be described later in detail.

Figure 5:
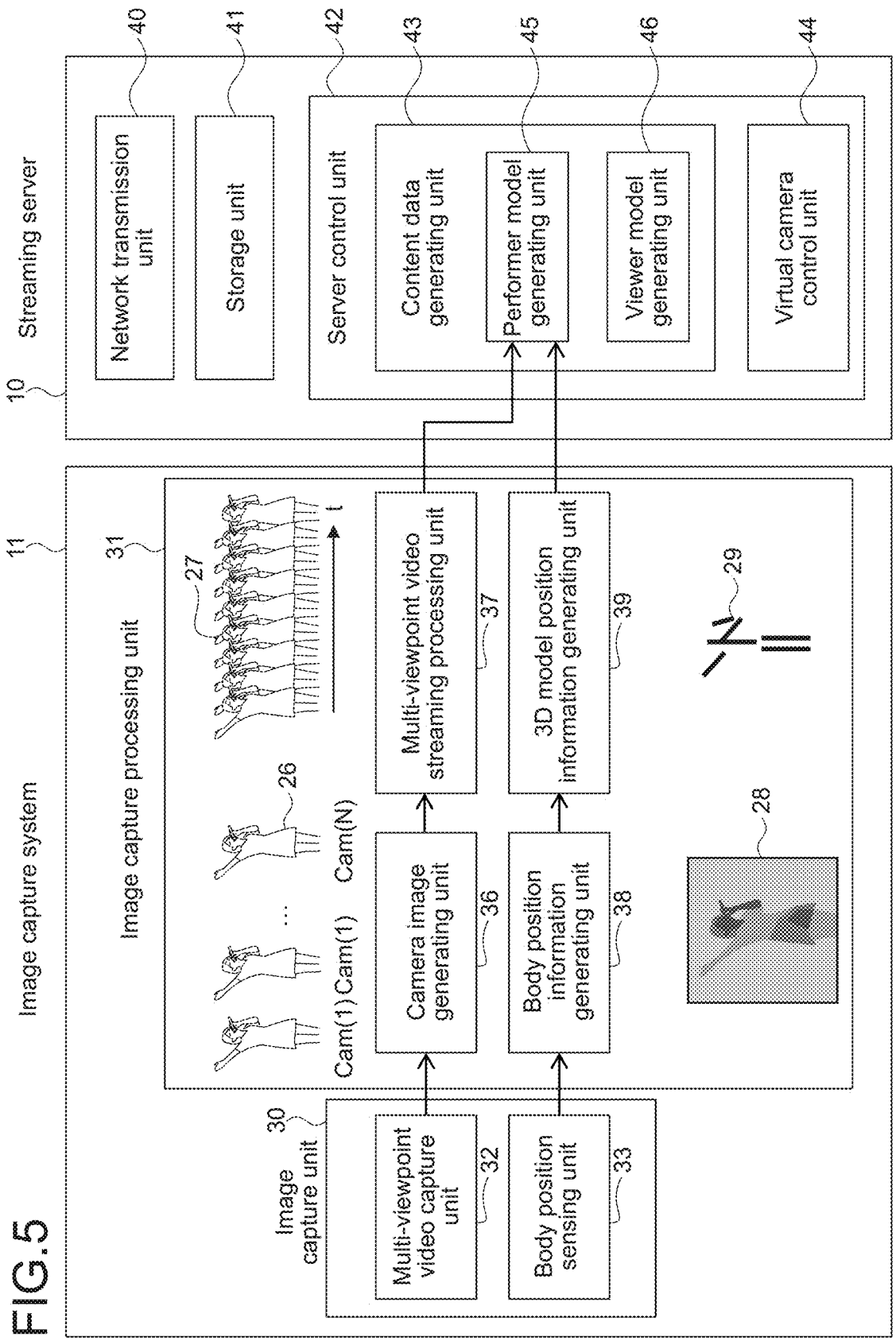
FIG. 5 A block diagram showing a functional configuration example of an image capture system and a streaming server.

FIG. 5 is a block diagram showing a functional configuration example of the image capture system 11 and the streaming server 10. The image capture system 11 and the streaming server 10 are streaming-side systems that a streamer uses to stream the live content in the streaming system 100. For example, the performer 1 who appears in the live concert or a company that performs planning and the like of the live content is the streamer.

[Configuration of Image Capture System]

The image capture system 11 generates data required for generating a volumetric model of the performer 1. As shown in FIG. 5, the image capture system 11 includes an image capture unit 30 and an image capture processing unit 31.

The image capture unit 30 includes a group of devices for imaging/sensing the performer 1, and for example, is used in a shooting studio for capturing an image of the performer 1. In the present embodiment, the image capture unit 30 includes a multi-viewpoint video capture unit 32 and a body position sensing unit 33.

Figure 6:
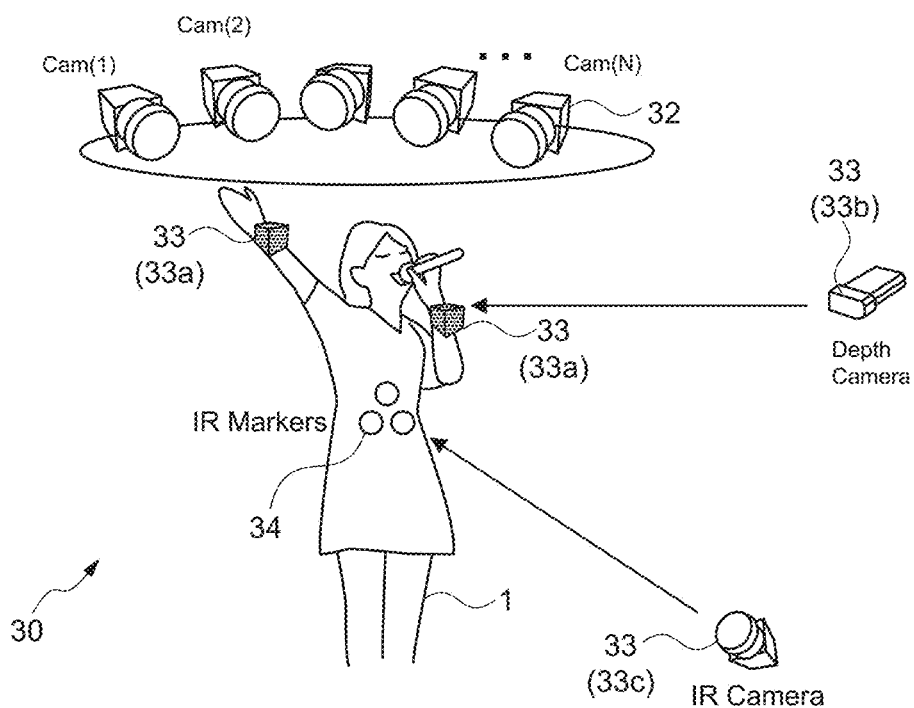
FIG. 6 A schematic view showing a configuration example of an image capture unit.

FIG. 6 is a schematic view showing a configuration example of the image capture unit 30.

The multi-viewpoint video capture unit 32 is a multi-camera unit including a plurality of cameras. FIG. 6 schematically shows an N-number of cameras (Cam (1) to Cam (N)) that constitute the multi-viewpoint video capture unit 32. The respective cameras are, for example, arranged at different positions so as to capture images of the performer 1 in all directions. Accordingly, a volumetric model combining images of the entire body of the performer 1 can be generated. It can be thus said that the multi-viewpoint video capture unit 32 is a multi-viewpoint camera for volumetric image capture.

The body position sensing unit 33 includes sensors (motion sensors) for detecting positions of respective parts of the body of the performer 1. In the example shown in FIG. 6, a wearable position sensor 33a, a depth camera 33b, and infrared cameras 33c are used as the body position sensing unit 33.

It should be noted that the kinds of sensors that are used as the body position sensing unit 33 and the like are not limited, and other motion sensors may be used. Further, these sensors may be used alone or all or some of the sensors may be used in combination.

The wearable position sensor 33a is a sensor that the performer 1 wears on the body and uses, and detects a position of the wearing site. For example, in the example shown in FIG. 6, the wearable position sensor 33a is worn on each of the right and left wrists of the performer 1. In this case, positions of the wrists of the performer 1 are detected, and motions of the hands of the performer 1 can be detected.

The depth camera 33b is a camera that captures a depth image of the image capture target (performer 1). The depth image is an image for which a distance (depth) to the image capture target has been detected for each pixel. The use of the depth image can detect the positions of the respective parts of the body of the performer 1. For example, a ToF camera or the like is used as the depth camera 33b.

The infrared cameras 33c is a camera that emits an infrared ray to the image capture target and captures an infrared image. In a case where the infrared cameras 33c is used, for example, infrared markers 34 that selectively reflect infrared rays are worn on the body of the performer 1, and an infrared image of the performer 1 is captured. From states of the infrared markers 34 in the thus captured infrared image, the positions of the wearing sites can be detected.

Figure 7:
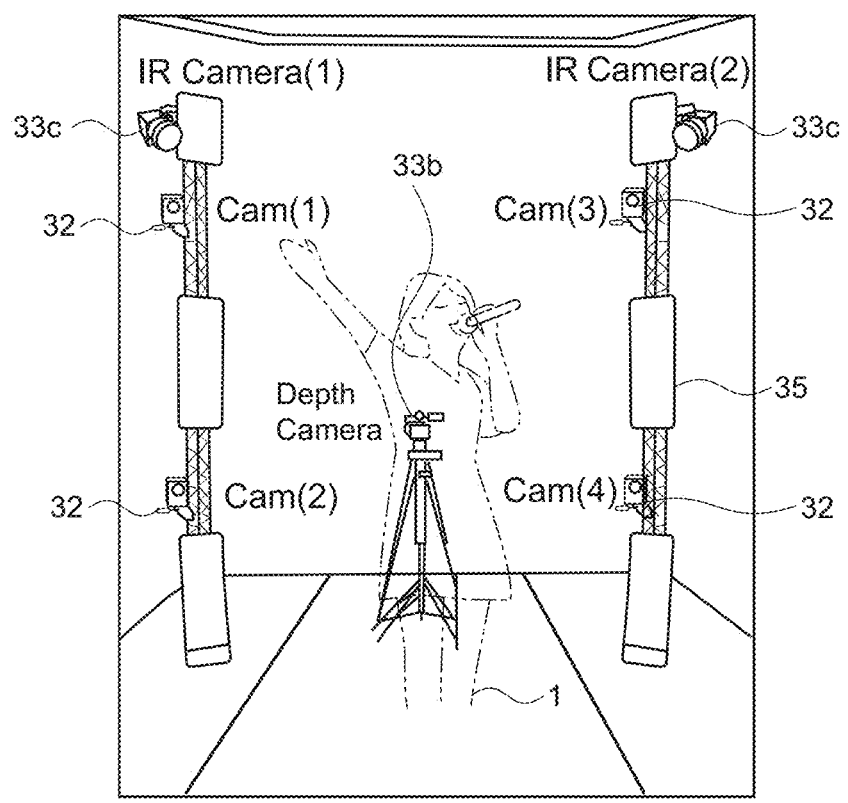
FIG. 7 A schematic view showing an example of a shooting studio.

FIG. 7 is a schematic view showing an example of the shooting studio. The shooting studio is, for example, a green back studio using green members on the background and floor.

In the shooting studio, for example, poles that fix respective cameras of the multi-viewpoint video capture unit 32 are installed. In the example shown in FIG. 7, Cam (1) and Cam (2) are fixed to upper part and lower part of the pole on the left-hand side in the figure, and Cam (3) and Cam (4) are fixed to upper part and lower part of the pole on the right-hand side. Further, the infrared cameras 33c are respectively arranged at upper ends of the respective poles. In addition, the poles are provided with illumination lights 35, respectively. A plurality of such poles is arranged to surround the performer 1 for example. Accordingly, it becomes possible to capture images of the performer 1 in all directions.

Further, in the shooting studio, the depth camera 33b is arranged. A distance between the depth camera 33b and the performer 1 is set to be a predetermined value (e.g., approximately 0.5 m to 5.5 m) so that a depth image of a necessary range can be captured. It should be noted that a specific configuration of the shooting studio is not limited. For example, a photographic equipment capable of image capture and sensing required for generating the performer model 4 may be used as appropriate.

Referring back to FIG. 5, the image capture processing unit 31 is a data processing device that integrates output of the image capture unit 30 to generate data required for generating the volumetric model. For example, a computer such as a personal computer (PC) is used as the image capture processing unit 31. Alternatively, the streaming server 10 to be described later may constitute the image capture processing unit 31.

The image capture processing unit 31 includes, as functional blocks, a camera image generating unit 36, a multi-viewpoint video streaming processing unit 37, a body position information generating unit 38, and a 3D model position information generating unit 39.

The camera image generating unit 36 reads output of the multi-viewpoint video capture unit 32 and generates a camera image 26 captured by each camera. The camera images 26 are images obtained by performing image capture on the performer 1 from a plurality of viewpoints at the same timing. FIG. 5 schematically shows the camera images 26 captured by the respective cameras (Cam (1) to Cam (N)).

The multi-viewpoint video streaming processing unit 37 generates a multi-viewpoint video 27 of the performer 1 on the basis of the plurality of camera images 26, and performs a streaming process with respect to the multi-viewpoint video 27. The multi-viewpoint video 27 is generated by, for example, synchronizing image capture timings of the camera images 26 and arranging them along a time axis. The streaming process such as compression and conversion and the like is performed on the multi-viewpoint video 27. In FIG. 5, an example of the multi-viewpoint video 27 is schematically shown as a image sequence along the time axis.

The body position information generating unit 38 reads output of the body position sensing unit 33 and generates body position information representing the positions of the respective parts of the body of the performer 1. For example, position information of a site where the wearable position sensor 33a is worn, a depth image 28 of the performer 1 that has been captured by the depth camera 33b, infrared images of the performer 1 (infrared markers 34) that have been captured by the infrared cameras 33c, and the like are generated as the body position information. In FIG. 5, the depth image 28 of the performer 1 is schematically shown as an example of the body position information.

The 3D model position information generating unit 39 generates model position information representing positions of respective parts of the performer model 4 (here, the volumetric model of the performer 1) on the basis of the above-mentioned body position information. Specifically, a bone estimation process is performed on the basis of the body position information, and bone data 29 obtained by estimating positions and attitudes of the bones of the performer 1 is calculated. The bone data 29 is used as the model position information of the performer model 4. FIG. 5 schematically shows an example of the bone data 29.

It should be noted that a method other than the above-mentioned bone estimation may be used as the method of sensing a body position of the performer 1. For example, position estimation of body respective parts using image recognition, three-dimensional position estimation using machine learning, or the like may be used. Alternatively, a motion capture technology using infrared detection with the infrared cameras and the infrared markers or the like may be used.

[Configuration of Streaming Server]

The streaming server 10 includes a network transmission unit 40, a storage unit 41, and a server control unit 42.

The network transmission unit 40 is a communication module that performs network communication with other devices via the Internet 13. The network transmission unit 40 has, for example, a data sending function of sending data (live content or the like) generated by the streaming server 10 and a data receiving function of receiving data sent from the client terminal 12 via the Internet 13.

A specific configuration of the network transmission unit 40 is not limited, and various communication modules adapted for a wired LAN, a wireless LAN, optical communication, or the like may be used.

The storage unit 41 is a nonvolatile storage device. For example, a recording medium using a solid-state element such as a solid state drive (SSD) or a magnetic recording medium such as a hard disk drive (HDD) is used as the storage unit 41. In addition, the kinds of recording media that are used as the storage unit 41 and the like are not limited, and for example, any recording medium that records data non-transitorily may be used.

A control program according to the present embodiment is stored in the storage unit 41. The control program is, for example, a program for controlling the overall operation of the streaming server 10. In addition, information stored in the storage unit 41 is not limited.

The server control unit 42 controls the operation of the streaming server 10. The server control unit 42, for example, has a hardware configuration required for computer, such as a CPU and a memory (RAM, ROM). The CPU loads the control program stored in the storage unit 41 into the RAM and executes the control program, and various types of processing are thus performed. The server control unit 42 corresponds to an information processing apparatus according to the present embodiment.

For example, a programmable logic device (PLD) such as a field programmable gate array (FPGA) or another device such as an application specific integrated circuit (ASIC) may be used as the server control unit 42. Moreover, for example, a processor such as a graphics processing unit (GPU) may be used as the server control unit 42.

In the present embodiment, the CPU of the server control unit 42 executes the program (control program) according to the present embodiment, and a content data generating unit 43 and a virtual camera control unit 44 are thus realized as functional blocks. Then, these functional blocks perform the information processing method according to the present embodiment. It should be noted that dedicated hardware such as integrated circuit (IC) may be used as appropriate in order to realize the respective functional blocks.

Here, the content data generating unit 43 generates content data. The content data is, for example, data required for configuring the virtual space 3. The content data includes data relating to the virtual objects (the performer model 4, the viewer models 5, the stage set, and the like) arranged in the virtual space 3, sound data in the virtual space 3, and comments and the like from the performer and the viewers.

As shown in FIG. 5, the content data generating unit 43 includes a performer model generating unit 45 and a viewer model generating unit 46.

The performer model generating unit 45 generates the performer model 4 that is the virtual model of the performer 1. Specifically, on the basis of the multi-viewpoint video 27 and the bone data 29 of the performer 1 output from the image capture system 11, data about the volumetric model of the performer 1 (performer model 4) is generated.

For example, shape data and texture data of the performer model 4 are generated from the multi-viewpoint video 27. Moreover, for example, movement data of the performer model 4 is generated from the bone data 29.

Further, the performer model generating unit 45 calculates an arrangement position of the performer model 4 in the virtual space 3 in accordance with movement of the performer 1, direction for the live concert, and the like.

The viewer model generating unit 46 generates the viewer models 5 that are the virtual models of the viewers 2. Specifically, the viewer model generating unit 46 acquires data representing positions of the respective parts (head, hands, and the like) of the body of the viewer 2 from each client terminal 12 and generates data about the viewer model 5 (virtual avatar or the like) on the basis of such data. The design and the like of the viewer model 5 may be specified by the viewer 2, for example, or a default design may be used.

Further, the viewer model generating unit 46 calculates the arrangement position of each viewer model 5 in the virtual space 3 in accordance with movement of the viewer 2 and the like.

In addition, the content data generating unit 43 generates data about the other virtual objects arranged in the virtual space 3, voice data of the performer 1 and the viewer 2, play data of a piece of music, and the like as the content data. Specific contents of the content data are not limited.

The content data generated by the content data generating unit 43 is streamed to each client terminal 12 as the live content.

The virtual camera control unit 44 controls the virtual camera 20 to generate the virtual camera video 22 (see FIG. 4) obtained by capturing images of the virtual space 3 with the virtual camera 20.

For example, the performer model 4 and the viewer models 5 generated by the content data generating unit 43 are arranged in the virtual space 3, and a virtual live concert revenue is reproduced. The virtual camera control unit 44 controls the behavior of the virtual camera 20 in the thus configured virtual space 3.

In the present embodiment, the virtual camera control unit 44 performs the collision avoidance process for avoiding a collision of the virtual camera 20 against the performer model 4 in a manner that depends on the positional relationship between the performer model 4 that moves in the virtual space 3 and the virtual camera 20 that moves in the virtual space 3 and captures an image of the performer model 4. In the present embodiment, the virtual camera control unit 44 corresponds to an image capture control unit.

The positional relationship between the performer model 4 and the virtual camera 20 is expressed using a distance (relative distance) between the performer model 4 and the virtual camera 20 typically. It should be noted that the distance between the performer model 4 and the virtual camera 20 may be a current value or may be a predicted value.

For example, the distance between the performer model 4 and the virtual camera 20 is monitored, and the collision avoidance process is performed in a case where that value satisfies predetermined conditions. Alternatively, as the collision avoidance process, a process of successively controlling the behavior of the virtual camera 20 is performed so that the distance between the performer model 4 and the virtual camera 20 satisfies the predetermined conditions.

Moreover, the virtual camera control unit 44 generates the virtual camera video 22. For example, images viewed from the virtual camera 20 that moves in the virtual space 3 during the live concert are generated at a predetermined frame rate. The virtual camera video 22 obtained by capturing images of the virtual space 3 during the live concert is generated on the basis of these images.

The virtual camera video 22 is streamed by each client terminal 12 as the live content. In this manner, in the present embodiment, the images (virtual camera video 22) captured by the virtual camera 20 are streamed in real time.

[Configuration of Client Terminal]

Figure 8:
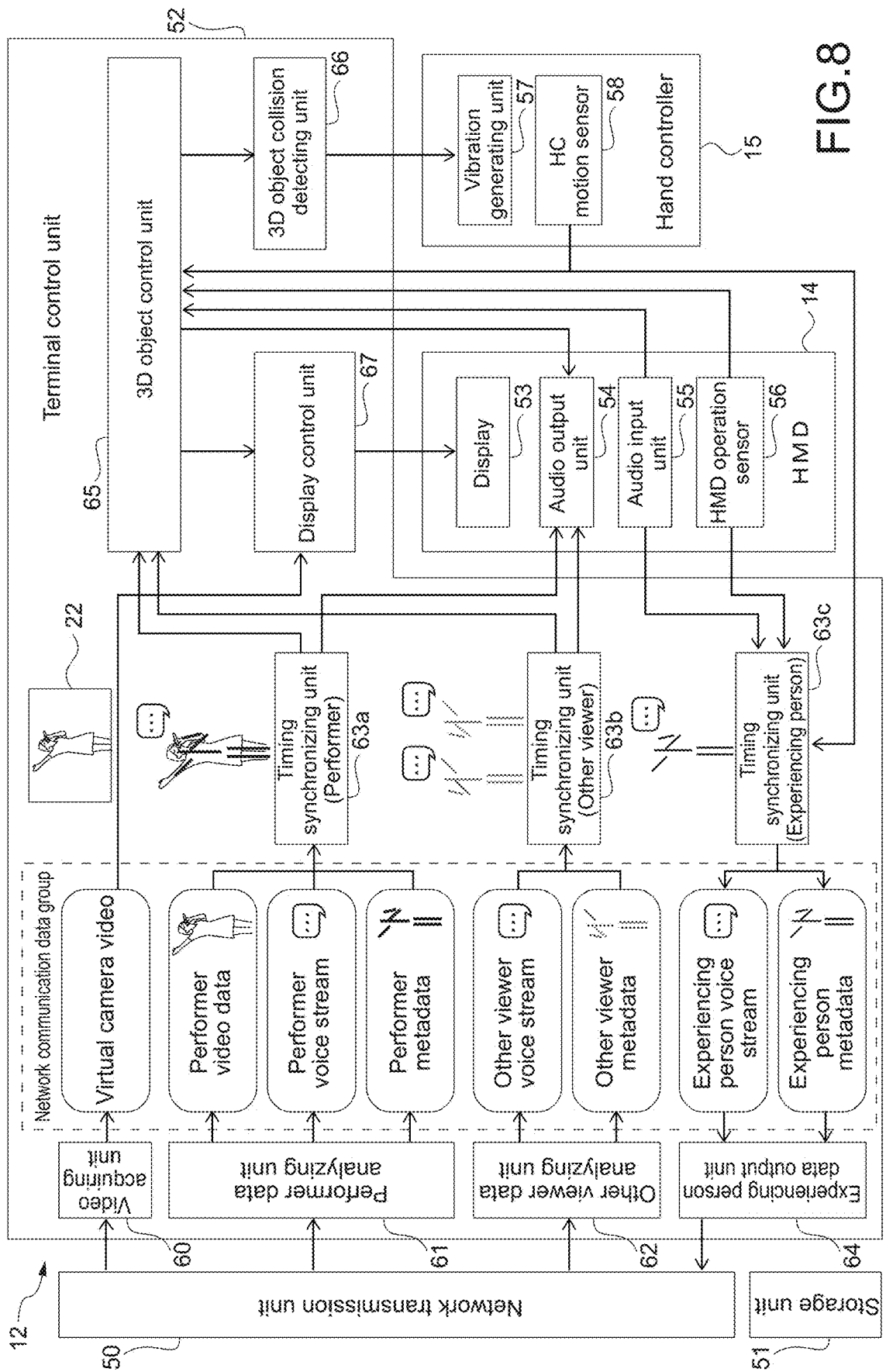
FIG. 8 A block diagram showing a functional configuration example of a client terminal.

FIG. 8 is a block diagram showing a functional configuration example of the client terminal 12. The client terminal 12 includes a network transmission unit 50, a storage unit 51, and a terminal control unit 52. Moreover, the client terminal shown in FIG. 8 includes the HMD 14 and a hand controller 15.

In the present embodiment, the client terminal 12 functions as a display apparatus.

Here, the viewer 2 using the client terminal 12 will be referred to as an experiencing person and the viewers 2 other than the experiencing person will be referred to as other viewers.

The HMD 14 is a display apparatus that the experiencing person wears on the head and uses. The HMD 14 includes a display 53, an audio output unit 54, an audio input unit 55, and an HMD operation sensor 56.

The display 53 is arranged to cover the field of view of the experiencing person. For example, a liquid-crystal display or an organic EL display is used as the display 53. The audio output unit 54 is an element that reproduces sound of loudspeakers, headphones, and the like. The audio input unit 55 is an element that detects sound of a microphone and the like. The HMD operation sensor 56 is a sensor that detects position and attitude of the main body of the HMD 14, and for example, includes an acceleration sensor, a gyro sensor, a direction sensor, and the like.

In the present embodiment, the display 53 corresponds to a display unit that displays the image captured by the virtual camera.

A hand controller (HC) 15 is an operation device that receives input operations depending on motions of the hands of the experiencing person. A grip type device that the experiencing person grips and operates or a wearable device that the experiencing person wears on the hands of the experiencing person and uses is used as the hand controller 15. The hand controller 15 includes a vibration generating unit 57 and an HC motion sensor 58.

The vibration generating unit 57 is a device that produces vibrations and, for example, a voice coil motor, an eccentric motor, or the like is used. The HC motion sensor 58 is a sensor that detects position and attitude of the main body of the hand controller 15.

The network transmission unit 50 is a communication module that performs network communication with other devices via the Internet 13.

The network transmission unit 50 has, for example, a data receiving function of receiving data generated by the streaming server 10 and a data sending function of sending data generated by the client terminal 12.

The storage unit 51 is a nonvolatile storage device, and a recording medium such as a SSD and an HDD is used. The storage unit 51 stores a control program for controlling the overall operation of the client terminal 12. In addition, information stored in the storage unit 51 is not limited.

The terminal control unit 52 controls the operation of the client terminal 12. The terminal control unit 52, for example, has a hardware configuration required for computer, such as a CPU and a memory (RAM, ROM). The CPU loads the control program stored in the storage unit 51 into the RAM and executes the control program, and various types of processing are thus performed. A specific configuration of the terminal control unit 52 is not limited.

In the present embodiment, the CPU of the terminal control unit 52 executes the control program stored in the storage unit 51, and the various functional blocks are thus realized.

As shown in FIG. 8, the terminal control unit 52 includes, as functional blocks, a video acquiring unit 60, a performer data analyzing unit 61, an other viewer data analyzing unit 62, timing synchronizing units 63a to 63c, an experiencing person data output unit 64, a 3D object control unit 65, a 3D object collision detecting unit 66, and a display control unit 67.

Further, data (network communication data group) sent and received via the Internet 13 is schematically shown in the region surrounded by the dashed line of FIG. 8.

The video acquiring unit 60 acquires the virtual camera video 22 captured by the virtual camera 20 via the network transmission unit 50, and outputs the video to the display control unit 67. FIG. 8 schematically shows the virtual camera video 22 that is output to the display control unit 67.

As described above, in the present embodiment, the streaming server 10 (virtual camera control unit 44) performs the collision avoidance process for avoiding a collision of the virtual camera 20 against the performer model 4 in a manner that depends on a positional relationship between the performer model 4 that moves in the virtual space 3 and the virtual camera 20 that moves in the virtual space 3 and captures an image of the performer model 4. Therefore, the video acquiring unit 60 acquires images (virtual camera video 22) captured by the virtual camera 20 that moves in accordance with such a collision avoidance process.

In the present embodiment, the video acquiring unit 60 corresponds to an image acquiring unit.

The performer data analyzing unit 61 acquires data relating to the performer 1 via the network transmission unit 50, analyzes the acquired data, and generates performer data (performer video data, performer voice stream, performer metadata).

The performer video data is, for example, data representing the appearance (shape and texture) of the performer model 4. The performer voice stream is, for example, streaming data of the voice of the performer 1 and the piece of music. The performer metadata is, for example, data (bone data 29) about a body position of the performer model 4 and text data of comments and the like from the performer 1. The data about the body position is, for example, data representing positions and attitudes of the head and the both hands, and data representing the respective parts with six degrees of freedom (DoF) or three DoF is used. The performer data generated by the performer data analyzing unit 61 is output to a timing synchronizing unit 63a.

The other viewer data analyzing unit 62 acquires data relating to the other viewers other the experiencing person via the network transmission unit 50, analyzes the acquired data, and generates other viewer data (other viewer voice stream, other viewer metadata).

The other viewer voice stream is streaming data of the voice of the other viewers. The other viewer metadata is, for example, data (bone data and the like) about the virtual avatars (viewer models 5) that the other viewers use and text data of comments from the other viewers and the like. The other viewer data generated by the other viewer data analyzing unit 62 is output to a timing synchronizing unit 63b.

The timing synchronizing unit 63a synchronizes timings of the performer data (performer video data, performer voice stream, performer metadata) generated by the performer data analyzing unit 61. FIG. 8 schematically shows the performer data the timings of which have been synchronized.

Graphics-related data (performer video data, bone data 29, comments, and the like) of the synchronized performer data is output to the 3D object control unit 65. Moreover, voice-related data (performer voice stream and the like) is output to the audio output unit 54 of the HMD 14.

The timing synchronizing unit 63b synchronizes timings of the other viewer data (other viewer voice stream, other viewer metadata) generated by the other viewer data analyzing unit 62. FIG. 8 schematically shows the other viewer data the timings of which have been synchronized.

Graphics-related data (bone data, comments, and the like) of the synchronized other viewer data is output to the 3D object control unit 65. Moreover, voice-related data (other viewer voice stream and the like) is output to the audio output unit 54 of the HMD 14.

The timing synchronizing unit 63c generates experiencing person data (experiencing person voice stream, experiencing person metadata) relating to the experiencing person using the client terminal 12 so that the timings are synchronized.

The experiencing person voice stream is streaming data of the voice of the experiencing person and is generated on the basis of output of the audio input unit 55 of the HMD 14. The experiencing person metadata is, for example, data (bone data and the like) about the virtual avatar (viewer model 5) that the experiencing person uses. The data about the virtual avatar is generated on the basis of output of the HMD operation sensor 56 of the HMD 14 and the HC motion sensor 58 of the hand controller 15. Further, text data of comments from the experiencing person and the like may be generated as the experiencing person metadata on the basis of character input, voice recognition, or the like.

The experiencing person data output unit 64 compresses and converts the experiencing person data to generate experiencing person data to be sent. This data is sent to the streaming server 10 via the network transmission unit 50.

The streaming server 10 generates the viewer models 5 and the like corresponding to the respective viewers 2 on the basis of the experiencing person data sent from the respective client terminals 12 for example.

The 3D object control unit 65 generates the virtual objects (3D objects) of the performer model 4, the viewer models 5, and the like and configures the virtual space 3 (see FIG. 2) in which the virtual objects are arranged.

For example, on the basis of output of the timing synchronizing unit 63a, the performer model 4 (volumetric model of the performer 1) is generated. Moreover, on the basis of output of the timing synchronizing unit 63b, the viewer models 5 that the other viewers use are generated. Further, on the basis of output of the HMD operation sensor 56 and the HC motion sensor 58, the viewer model 5 (virtual avatar of the experiencing person) that the experiencing person uses is generated. Moreover, icons and the like representing comments from the performer 1, the other viewers, and the experiencing person are arranged in the virtual space 3.

The data relating to the virtual space 3 that has been configured by the 3D object control unit 65 is output to the 3D object collision detecting unit 66 and the display control unit 67.

The 3D object collision detecting unit 66 detects a collision (contact) of the virtual model in the virtual space 3. Specifically, the 3D object collision detecting unit 66 detects a collision between the viewer model 5 used by the experiencing person and another virtual object (e.g., the performer model 4 or the other viewer model 5).

Further, when the 3D object collision detecting unit 66 detects a collision between the models, the 3D object collision detecting unit 66 generates a vibration signal corresponding to a collision. The generated vibration signal is output to the vibration generating unit 57 of the hand controller 15.

The display control unit 67 controls the display of the virtual space 3 in the client terminal 12 (here, the display 53 of the HMD 14). Specifically, the display control unit 67 generates a video output to the display 53 (hereinafter, referred to as output video) as appropriate.

On the basis of data about the virtual space 3, the display control unit 67 generates the field-of-view video representing a field of view of the viewer model 5 used by the experiencing person. Moreover, the virtual camera video 22 captured by the virtual camera 20 is input into the display control unit 67.

In the present embodiment, the field-of-view video and the virtual camera video 22 are switched and used as the output video. For example, the field-of-view video and the virtual camera video 22 are each switched in accordance with a predetermined switching operation or the like performed by the experiencing person.

In addition, the method of generating the output video and the like are not limited. For example, in a case where the client terminal 12 is provided with a plurality of displays, the field-of-view video and the virtual camera video 22 may be individually output. Moreover, in a case where the viewer models 5 and the like are not used, a configuration to output only the virtual camera video 22 may be used.

Moreover, the present technology is not limited to the case where the streaming server 10 generates the virtual camera video 22, and for example, the client terminal 12 may generate the virtual camera video 22. In this case, for example, the virtual camera 20 captures an image of the virtual space 3 configured by the client terminal 12. In this case, the collision avoidance process for the virtual camera 20 to be described later is performed in the client terminal 12.

[Operation of Virtual Camera Control Unit]

Movements of the virtual camera control unit 44 of the streaming server 10 will be specifically described.

The virtual camera control unit 44 monitors the positional relationship between the performer model 4 and the virtual camera 20 in the virtual space 3. On the basis of a result of the monitoring, a state in which a collision between the performer model 4 and the virtual camera 20 is likely to occur is previously detected.

Specifically, the virtual camera control unit 44 detects a proximity state of the performer model 4 and the virtual camera 20 on the basis of the positional relationship between the performer model 4 and the virtual camera 20. Then, in a case where the proximity state has been detected, the collision avoidance process is performed.

Here, the proximity state is, for example, a state in which a collision between the performer model 4 and the virtual camera 20 is likely to occur because the performer model 4 and the virtual camera 20 are in proximity with each other. Therefore, in a case where the proximity state has been detected, the collision avoidance process is performed in order to previously avoid a collision of the virtual camera 20 against the performer model 4.

Figure 9:
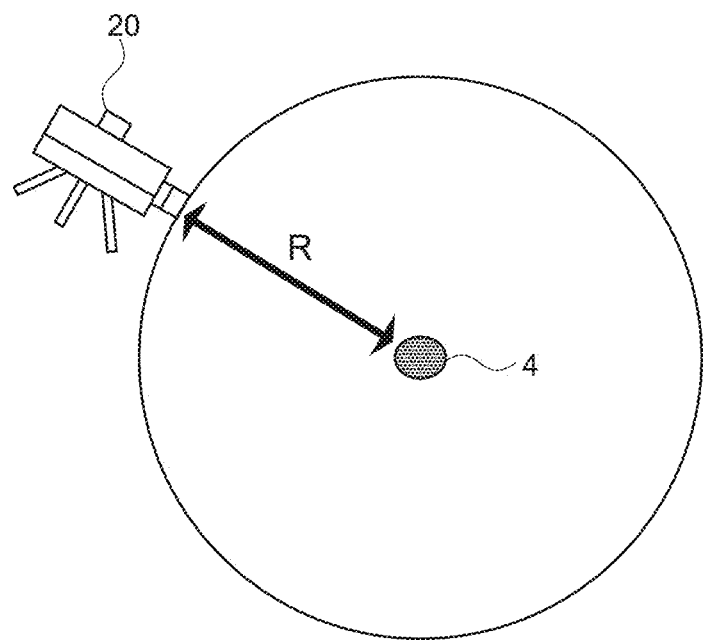
FIG. 9 A schematic view showing an example of a proximity state.

FIG. 9 is a schematic view showing an example of the proximity state.

In the present embodiment, the virtual camera control unit 44 detects a state in which a relative distance between the performer model 4 and the virtual camera 20 is equal to or smaller than a predetermined threshold R as the proximity state. FIG. 9 schematically shows the state in which the relative distance=R is established.

Here, the relative distance between the performer model 4 and the virtual camera 20 is, for example, a distance between a reference point of the performer model 4 and a reference point of the virtual camera 20. The reference point of the virtual camera 20 is typically a viewpoint (image capture position) of the virtual camera 20.

The reference point of the performer model 4 is, for example, set to be the center of gravity (model center position) of the performer model 4. In this case, the relative distance can be easily calculated, and computational resources required for monitoring the relative distance (positional relationship) can be reduced.

Further, the reference point may be set on a surface of the performer model 4. In this case, for example, the closest distance to the surface of the performer model 4 from the viewpoint of the virtual camera 20 is calculated as the relative distance. Accordingly, the state in which the virtual camera 20 is in proximity can be detected reliably irrespective of the shape, the size, and the like of the performer model 4.

Moreover, the relative distance between the performer model 4 and the virtual camera 20 may be a current value or may be a predicted value.

The current value of the relative distance is calculated on the basis of, for example, the current positions of the respective reference points of the performer model 4 and the virtual camera 20.

Moreover, the predicted value of the relative distance is calculated on the basis of, for example, predicted positions of the respective reference points of the performer model 4 and the virtual camera 20. The predicted position of the reference point of the performer model 4 is estimated on the basis of, for example, movement prediction using current movement direction and movement velocity of the performer model 4. Moreover, the predicted position of the reference point of the virtual camera 20 is estimated on the basis of an image capture path for the virtual camera 20. The use of the predicted value can reliably avoid a collision between the performer model 4 and the virtual camera 20.

As it will be described below, when the relative distance between the performer model 4 and the virtual camera 20 has become equal to or smaller than the threshold R and the proximity state has been detected, the path and the like for the virtual camera 20 are controlled so that the relative distance becomes larger than the threshold R. Therefore, it can be said that the threshold R is the minimum distance (close-up shot allowing value) at which the virtual camera 20 can perform image capture in proximity to the performer model 4.

The threshold R is set to be about 2 m in a life-size scale for example. The present technology is not limited thereto, and the threshold R may be set as appropriate in accordance with the kinds of performer model 4 and performance and the like.

[Collision Avoidance Process]

The collision avoidance process performed in a case where the proximity state has been detected will be described.

Hereinafter, it is assumed that the image capture path for the virtual camera 20 in the virtual space 3 is preset. That is, the virtual camera 20 captures images of the performer model 4 along the preset image capture path.

In the present embodiment, in a case where the virtual camera control unit 44 has detected the proximity state, the virtual camera control unit 44 changes the image capture path as the collision avoidance process.

Figure 10:
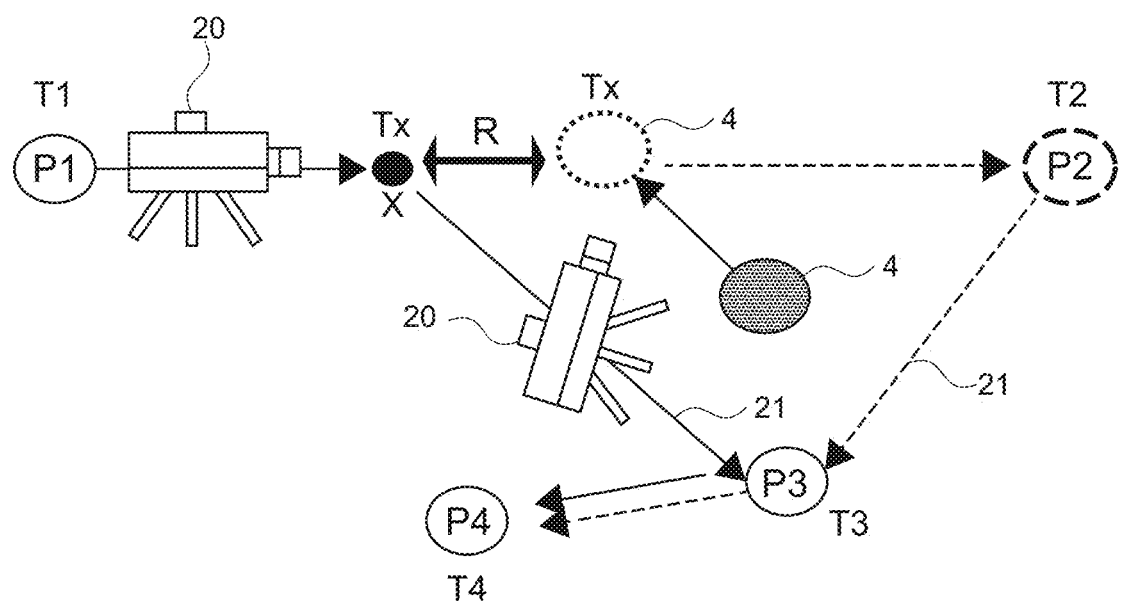
FIG. 10 A schematic view showing an example of a collision avoidance process of changing an image capture path.

FIG. 10 is a schematic view showing an example of the collision avoidance process of changing the image capture path.

FIG. 10 schematically shows the image capture path 21 of the virtual camera 20, which has been set in order to capture images of the performer model 4. The image capture path 21 has a plurality of relay points. The virtual camera control unit 44 moves the virtual camera 20 to pass through these relay points in the preset order and captures images of the performer model 4. In this manner, the image capture path 21 is a path set so that the virtual camera 20 passes through the plurality of relay points in order.

In the example shown in FIG. 10, the image capture path 21 is set to pass through relay points P1, P2, P3, and P4 in the stated order. The virtual camera 20 moves along straight lines connecting the respective relay points for example. It should be noted that the path between the relay points may be set to be curve. At this time, the image capture direction of the virtual camera 20 is adjusted as appropriate so that the performer model 4 falls within the image capture range (angle-of-view).

Moreover, for each relay point, a time of passage at which the virtual camera 20 should pass through the relay point is set. For example, times of passage T1, T2, T3, and T4 are set for the relay points P1, P2, P3, and P4, respectively. Therefore, the virtual camera 20 is moved to pass through the relay point P1 at the time T1, pass through the relay point P2 at the time T2, pass through the relay point P3 at the time T3, and pass through the relay point P4 at the time T4.

The image capture path 21 is thus the path in which the time of passage of the virtual camera 20 has been set for each of the plurality of relay points.

The image capture path 21 is set as appropriate so that the performer model 4 and the virtual camera 20 will not collide with each other, assuming the position of the performer model 4. The use of the image capture path 21 can specifically set various kinds of camera work depending on contents and the like of the performance that the performer model 4 (performer 1) gives. For example, in a case where a piece of music is played, the image capture path 21 suitable for a camera work schedule including times to shoot facial expressions of the performer model 4 in close-up and times to shoot the whole image of the performer model 4 is set.

Moreover, when the image capture path 21 is designed, at least one key relay point is set as the plurality of relay points. Here, the key relay point is, for example, a relay point at which it is desirable to perform image capture reliably in live performance, and may be set by a designer (e.g., performer, creator, director) of the image capture path 21 as appropriate. For example, a relay point for capturing an image of a particular pose of the performer model 4 or the performer model 4 in a high point part of the piece of music is set as the key relay point.

In addition, the method of setting the image capture path 21 is not limited. For example, the image capture path 21 may be set automatically. For example, the designer sets a rough movement route of the virtual camera 20. Based on this rough movement route, a final image capture path (relay point and time of passage) of the virtual camera 20 is automatically set in accordance with a duration of time of the content and a the motion of the performer 1.

It should be noted that the position of the performer model 4 changes successively depending on movement of the performer 1, direction for the live concert, and the like also while the virtual camera 20 is moving along the image capture path 21. Therefore, in a case where live streaming is performed, there is a possibility that the position of the performer model 4 moves more greatly than an assumed value when the image capture path 21 is set.

In the collision avoidance process shown in FIG. 10, in a case where the proximity state has been detected, the virtual camera control unit 44 changes a relay point that is a movement destination of the virtual camera 20 so that a collision between the performer model 4 and the virtual camera 20 is avoided. That is, the relay point that is the movement destination of the virtual camera 20 up to that time is changed to another relay point at a timing at which the proximity state is detected.

As a result, the image capture path 21 of the virtual camera 20 is changed to a path toward the changed relay point. Thus, the process of changing the relay point is the collision avoidance process of changing the image capture path 21. Accordingly, it becomes possible to previously avoid the situation where the virtual camera 20 collides against the performer model 4.

Specifically, in a case where the proximity (proximity state) between the performer model 4 and the virtual camera 20 has been detected in the image capture path 21 in which the plurality of relay points is predetermined, the image capture path 21 is changed toward the relay point smallest in the order at which a collision will not occur. That is, when the proximity state has been detected, shortcut to the relay point at the shortest distance on the image capture path 21 that can avoid a collision is performed.

This collision avoidance process includes the following processes.

A monitoring process of monitoring the trajectory of the virtual camera 20 in real time and detecting a proximity state in a manner that depends on a positional relationship between the performer model 4 and the virtual camera 20.

A path change process of selecting, in a case where the proximity state has been detected, a relay point smallest in the order at which a collision will not occur and changing the image capture path 21 so that route travel toward the relay point is performed.

A velocity adjustment process of adjusting the movement velocity of the virtual camera 20 by calculating it backwards on the basis of an increase or decrease in movement distance of the virtual camera 20 due to the change of the image capture path 21.

Hereinafter, the respective processes will be specifically described with reference to FIG. 10.

For example, a next movement destination of the virtual camera 20 that has passed through the relay point P1 at the time T1 is set for the relay point P2. Then, the virtual camera 20 is moved toward the relay point P2 from the relay point P1 so as to reach the relay point P2 at the time T2.

In the monitoring process, a relative distance between the performer model 4 and the moving virtual camera 20 is constantly calculated and the presence/absence of a proximity state is monitored on the basis of the relative distance. Specifically, whether or not the relative distance is equal to or smaller than the threshold R is determined.

For example, it is assumed that the proximity state has been detected because the performer model 4 has moved. In FIG. 10, at a timing at which the virtual camera 20 moving toward the relay point P2 reaches a point X at a time Tx, the relative distance between the performer model 4 and the virtual camera 20 becomes equal to or smaller than the threshold R and the proximity state is detected.

When the proximity state has been detected, the path change process is performed. Here, a relay point smallest in the order at which a collision will not occur is selected.

For example, relay points through which the virtual camera 20 has not passed are selected in an ascending order of the distance, and whether or not a collision will occur is determined in a case where the route is changed toward each of the relay points. Then, a relay point first determined to be a relay point at which a collision will not occur is selected as the next movement destination of the virtual camera 20.

The determination as to whether or not a collision will occur is, for example, performed on the basis of current position and movement prediction of the performer model 4 or a planned movement path (action plan) and the like of the performer model 4.

In FIG. 10, at the time Tx, the relay points P2, P3, and P4 are the relay points through which the virtual camera 20 has not passed. In a case where the virtual camera 20 is moved toward the relay point P2 of them, there is a fear that a collision with the performer model 4 will occur. In a case where the virtual camera 20 is moved toward the relay point P3, it is determined that a collision will not occur because the distance between the performer model 4 and the virtual camera 20 is longer. Therefore, the relay point P3 is set as the relay point smallest in the order at which a collision will not occur, as the next movement destination of the virtual camera 20.

In this manner, in the present embodiment, the virtual camera control unit 44 sets the movement destination of the virtual camera 20 to be the closest relay point that can avoid a collision between the performer model 4 and the virtual camera 20. Accordingly, it becomes possible to perform image capture in planned camera work without greatly changing the original image capture path 21.

It should be noted that the method of changing the relay point is not limited, and for example, a relay point at a short distance in the virtual space 3 may be selected, not based on the order on the image capture path 21. Accordingly, it becomes possible to quickly return to the original image capture path 21.

It should be noted that the method of changing the relay point is not limited. For example, it is possible to newly add a relay point at which the virtual camera 20 will not collide with the performer model 4 and move the virtual camera 20 toward the added relay point. That is, the relay points may be increased to thereby make a detour around the performer model 4 for avoiding a collision between the performer model 4 and the virtual camera 20.

When the image capture path 21 has been changed, the velocity adjustment process is performed. In the present embodiment, the virtual camera control unit 44 adjusts the movement velocity of the virtual camera 20 that moves on the changed image capture path 21 on the basis of the time of passage set for the relay point.

The movement distance of the virtual camera 20 changes by changing the relay point for example. Therefore, in a case where the movement velocity up to that time is maintained, there is a possibility that the schedule for image capture (camera work) changes. In order to prevent such a change of the schedule, the movement velocity of the virtual camera 20 is changed referring to the time of passage through the relay point. Accordingly, it is possible to prevent inconsistency and the like of a duration of time of a content moving image from occurring.

In the present embodiment, the virtual camera control unit 44 adjusts the movement velocity of the virtual camera in a manner that depends on a time of passage through the key relay point that is included in the changed image capture path 21.

Specifically, the movement velocity of the virtual camera 20 is increased or decreased so that the virtual camera 20 can pass through the key relay point at the time of passage set for the key relay point.

For example, it is assumed that the relay point P3 shown in FIG. 10 is the key relay point. In this case, the movement velocity of the virtual camera 20 is adjusted so that the virtual camera 20 passes through the relay point P3 at the time of passage T3 set for the relay point P3. For example, by performing shortcut to the relay point P3, the movement velocity is set to be slower in a case where the movement distance decreases and the movement velocity is set to be higher in a case where the movement distance increases.

Further, for example, in a case where the relay point P4 is set for the key relay point, the movement velocity of the virtual camera 20 is adjusted so that the virtual camera 20 passes through the relay point P4 at the time of passage T4 set for the relay point P4. In this case, the timing for passing through the relay point P3 does not necessarily need to be the time T3.

Adjusting the movement velocity of the virtual camera 20 on the basis of the time of passage through the key relay point in this manner can reliably perform image capture at the key relay point at an appropriate time. Accordingly, it becomes possible to perform image capture without missing an important scene in which the performer model 4 (performer 1) gives a particular performance.

It should be noted that the method of adjusting the movement velocity of the virtual camera 20 is not limited. For example, without referring to the key relay point and the like, the movement velocity may be adjusted depending on the time of passage of the changed relay point (the relay point P3 in FIG. 10). Accordingly, image capture close to an original schedule is performed. Alternatively, times of passage of the remaining relay points may be adjusted as appropriate in accordance with the whole play time and the like. In this case, the movement velocity of the virtual camera 20 is set in accordance with the adjusted time of passage. Accordingly, for example, it becomes possible to suppress unnatural increase/decrease in movement velocity.

Figure 11:
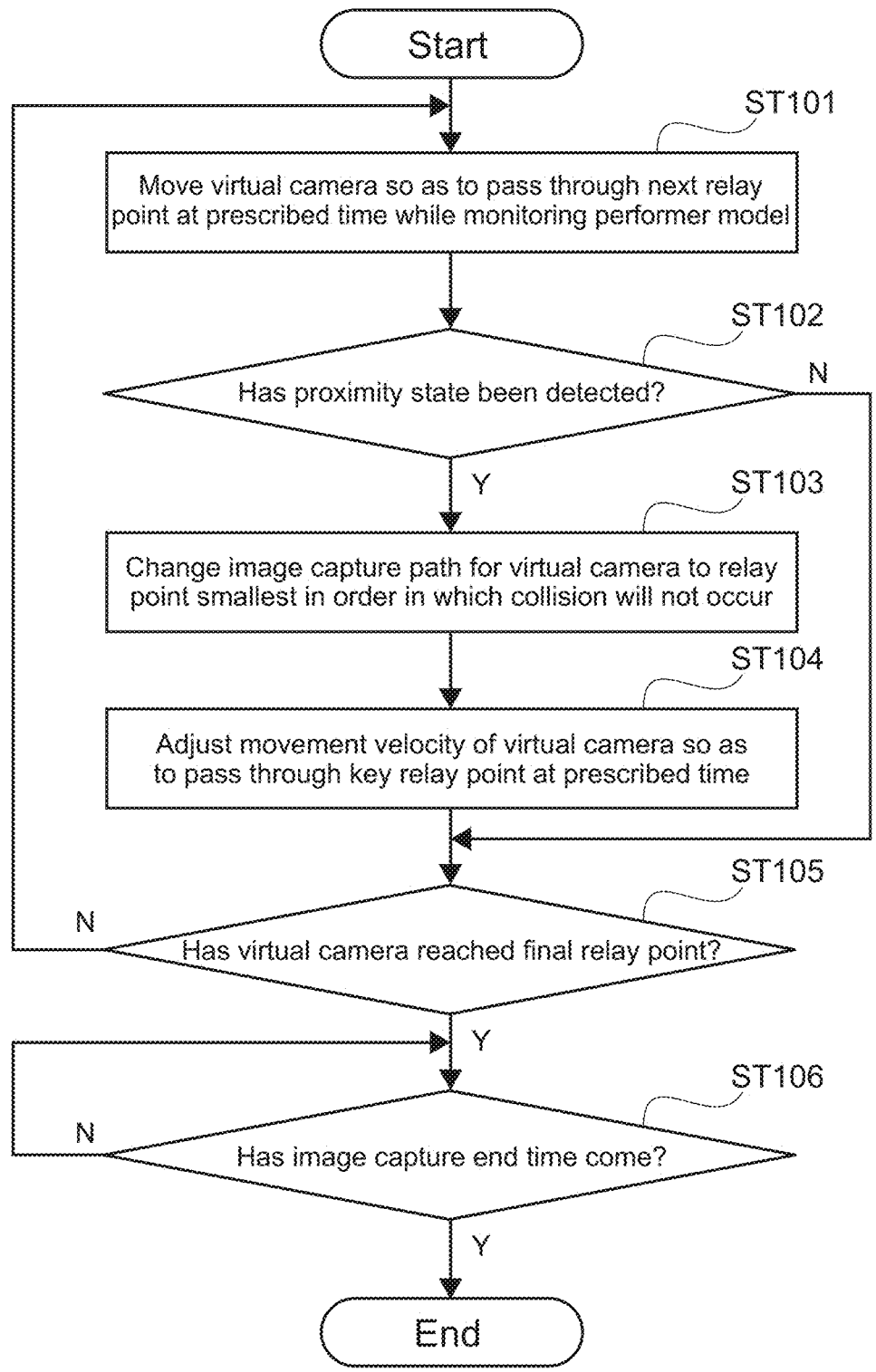
FIG. 11 A flowchart of the collision avoidance process shown in FIG. 10.

FIG. 11 is a flowchart of the collision avoidance process shown in FIG. 10.

First of all, the virtual camera 20 is moved so as to pass through the next relay point at the prescribed time while monitoring the performer model 4 (Step 101). For example, the position of the performer model 4 is monitored and a relative distance to the virtual camera 20 is calculated on the basis of a result of the monitoring. At this time, the movement velocity of the virtual camera 20 is set so as to reach the relay point at the time of passage through the relay point set as the movement destination.

Whether or not the positional relationship between the performer model 4 and the virtual camera 20 is the proximity state is determined (Step 102). The determination as to the proximity state is performed in accordance with the method described above with reference to FIG. 9 for example.

In a case where the proximity state has not been detected (No in Step 102), Step 105 to be described later is performed.

In a case where the proximity state has been detected (Yes in Step 102), the image capture path for the virtual camera 20 is changed to the relay point smallest in the order at which a collision will not occur (Step 103).

For example, in a case where the path has been changed to one of the relay points through which the virtual camera 20 has not passed, whether or not a collision can be avoided is determined, and a relay point smallest in the order that can avoid a collision is selected. Then, a new image capture path 21 for moving toward the selected relay point is set.

When the image capture path 21 has been changed, the movement velocity of the virtual camera 20 is adjusted so as to pass through the key relay point at the prescribed time (Step 104).

For example, the movement velocity is set to be slower in a case where the movement distance to the key relay point decreases and the movement velocity is set to be higher in a case where the movement distance increases. That is, a movement velocity of the virtual camera 20 is set by calculating it backwards the changed movement distance.

When the movement velocity has been adjusted, whether or not the virtual camera 20 has reached a final relay point is determined (Step 105). The final relay point is a final relay point set for the image capture path 21.

In a case where the virtual camera 20 has not reached the final relay point (No in Step 105), it is considered that there are still relay point(s) through which the virtual camera 20 has not passed and the processing of Step 101 and the steps after Step 101 is performed again. It should be noted that in a case where the image capture path 21 has been changed, the relay point that is the movement destination in Step 101 is changed to a newly set relay point, and the virtual camera 20 is moved at the movement velocity set in Step 104.

In a case where the virtual camera 20 has reached the final relay point (Yes in Step 105), whether or not an image capture end time has come is determined (Step 106). The image capture end time is a time for terminating the image capture by the virtual camera 20. The image capture end time is set as appropriate in accordance with a schedule for performance of the performer model 4 (performer) for example.

In a case where the image capture end time has not come (No in Step 106), the image capture from the final relay point is continued. In a case where the image capture end time has come (Yes in Step 106), the image capture by the virtual camera 20 ends and the live relay is finished.

Figure 12:
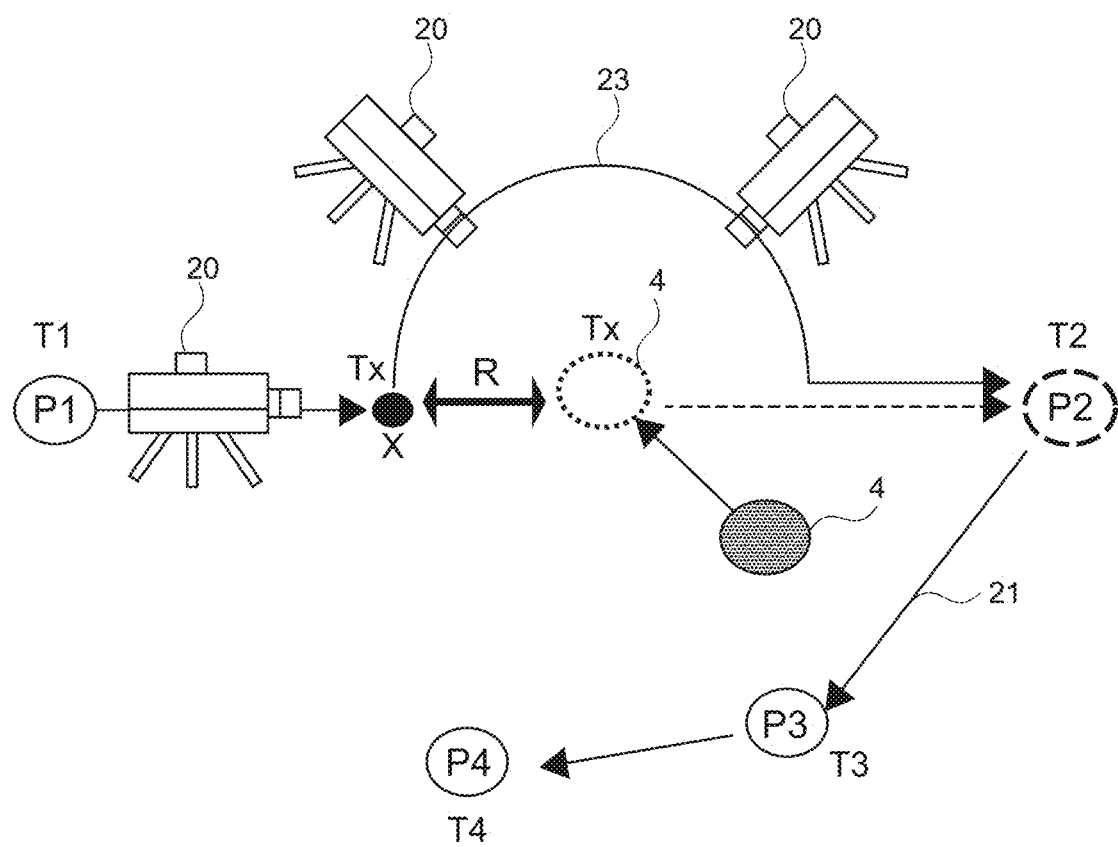
FIG. 12 A schematic view showing another example of the collision avoidance process of changing the image capture path.

FIG. 12 is a schematic view showing another example of the collision avoidance process of changing the image capture path.

In the collision avoidance process shown in FIG. 12, in a case where the proximity state has been detected, the virtual camera control unit 44 changes at least a part of the path to the relay point that is the movement destination of the virtual camera 20 so that a collision between the performer model 4 and the virtual camera 20 is avoided.

That is, the virtual camera 20 is moved along a new path for reaching the relay point that is the movement destination of the virtual camera 20. As a result, the image capture path 21 of the virtual camera 20 is changed to the new path from the previous path toward the next relay point (e.g., the path extending straight to the next relay point).

This new path may be a path returning to a halfway point of the previous path toward the next relay point or may be a path directly toward the next relay point without passing through the previous path.

The collision avoidance process of changing the path between the relay points is performed in this manner in FIG. 12. Accordingly, it becomes possible to previously avoid the situation where the virtual camera 20 collides against the performer model 4.

Specifically, in a case where the proximity (proximity state) between the performer model 4 and the virtual camera 20 has been detected in the image capture path 21 in which the plurality of relay points is predetermined, the virtual camera 20 is moved along an alternative path 23 for making a detour around the performer model 4 while monitoring the performer model 4.

That is, the virtual camera control unit 44 moves the virtual camera 20 along the alternative path 23 for making a detour around the performer model 4 from the point at which the proximity state has been detected.

It should be noted that the alternative path 23 is a path that changes depending on movement of the performer model 4 and the like.

This collision avoidance process includes the following processes.

A monitoring process of monitoring the trajectory of the virtual camera 20 in real time and detecting a proximity state in a manner that depends on a positional relationship between the performer model 4 and the virtual camera 20.

A path change process of changing, in a case where the proximity state has been detected, the image capture path 21 so that route travel toward the original relay point with a detour is performed while monitoring the performer model 4.

A velocity adjustment process of adjusting the movement velocity of the virtual camera 20 by calculating it backwards on the basis of an increase or decrease in movement distance of the virtual camera 20 due to the change of the image capture path 21.

Hereinafter, the respective processes will be specifically described with reference to FIG. 12.

The monitoring process is, for example, performed in a similar manner to the method described above with reference to FIG. 10. In FIG. 12, at a timing at which the virtual camera 20 toward the relay point P2 from the relay point P1 reaches the point X at the time Tx, the relative distance between the performer model 4 and the virtual camera 20 becomes equal to or smaller than the threshold R and the proximity state is detected.

When the proximity state has been detected, the path change process is performed. Here, the movement of the virtual camera 20 is controlled to make a detour to the original relay point (relay point P2 in FIG. 12). A track of the detour is the alternative path 23.

For example, as shown in FIG. 12, the virtual camera 20 is moved so as to make a detour around the performer model 4 from the detected point X at which the proximity state has been detected and return to the original path to the relay point P2. At this time, the behavior of the virtual camera 20 is controlled so that the relative distance between the performer model 4 and the virtual camera 20 is kept constant. Therefore, it can be said that the alternative path 23 is a path that keeps the relative distance between the performer model 4 and the virtual camera 20 constant.

FIG. 12 schematically shows a state of the detour of the virtual camera 20 performed in a case where the performer model 4 stays at a substantially constant position. In this case, the alternative path 23 is a circular-arc path for returning to the original path from the detected point X of the proximity state, using the performer model 4 as the center.

It should be noted that in a case where the performer model 4 further moves after the time Tx, a detour depending on the motion of the performer model 4 is made, and therefore the alternative path 23 is not necessarily the circular-arc shape.

In any case, the virtual camera 20 making a detour moves having a constant distance from the performer model 4, and a collision between the performer model 4 and the virtual camera 20 is avoided.

Further, the virtual camera 20 is moved so as to return to the original path. Therefore, deviation from the initially set camera work can be reduced sufficiently.

In addition, the method of changing the path to the relay point that is the movement destination is not limited. For example, an arbitrary path on which a collision will not occur, which connects the point at which the proximity state has been detected and the relay point that is the movement destination, may be calculated and used as the alternative path 23. In this case, the path on which a collision will not occur is calculated as appropriate on the basis of the current position, movement prediction, action plan, and the like of the performer model 4 for example.

When the image capture path 21 has been changed, the velocity adjustment process is performed. For example, the method described above with reference to FIG. 10 can be applied as the velocity adjustment process.

The movement velocity of the virtual camera 20 that moves on the changed image capture path 21 (alternative path 23) is adjusted on the basis of the time of passage set for the relay point for example. For example, the movement velocity of the virtual camera 20 is increased so that the virtual camera 20 reaches the relay point P2 by a time of passage T2 for the relay point P2. Accordingly, it becomes possible to quickly return to the original image capture schedule.

Further, in a case where the image capture path 21 includes a key relay point, the movement velocity of the virtual camera 20 is adjusted depending on a time of passage through the key relay point. For example, in a case where the relay point P3 is the key relay point, the movement velocity of the virtual camera 20 is increased so as to pass through the relay point P3 at the time T3. In this case, a change in movement velocity is smaller than that in a case where the movement velocity is increased depending on the time of passage T2 through the relay point P2. Accordingly, it becomes possible to reliably shoot an important scene while avoiding unnatural increase in velocity and the like.

Figure 13:
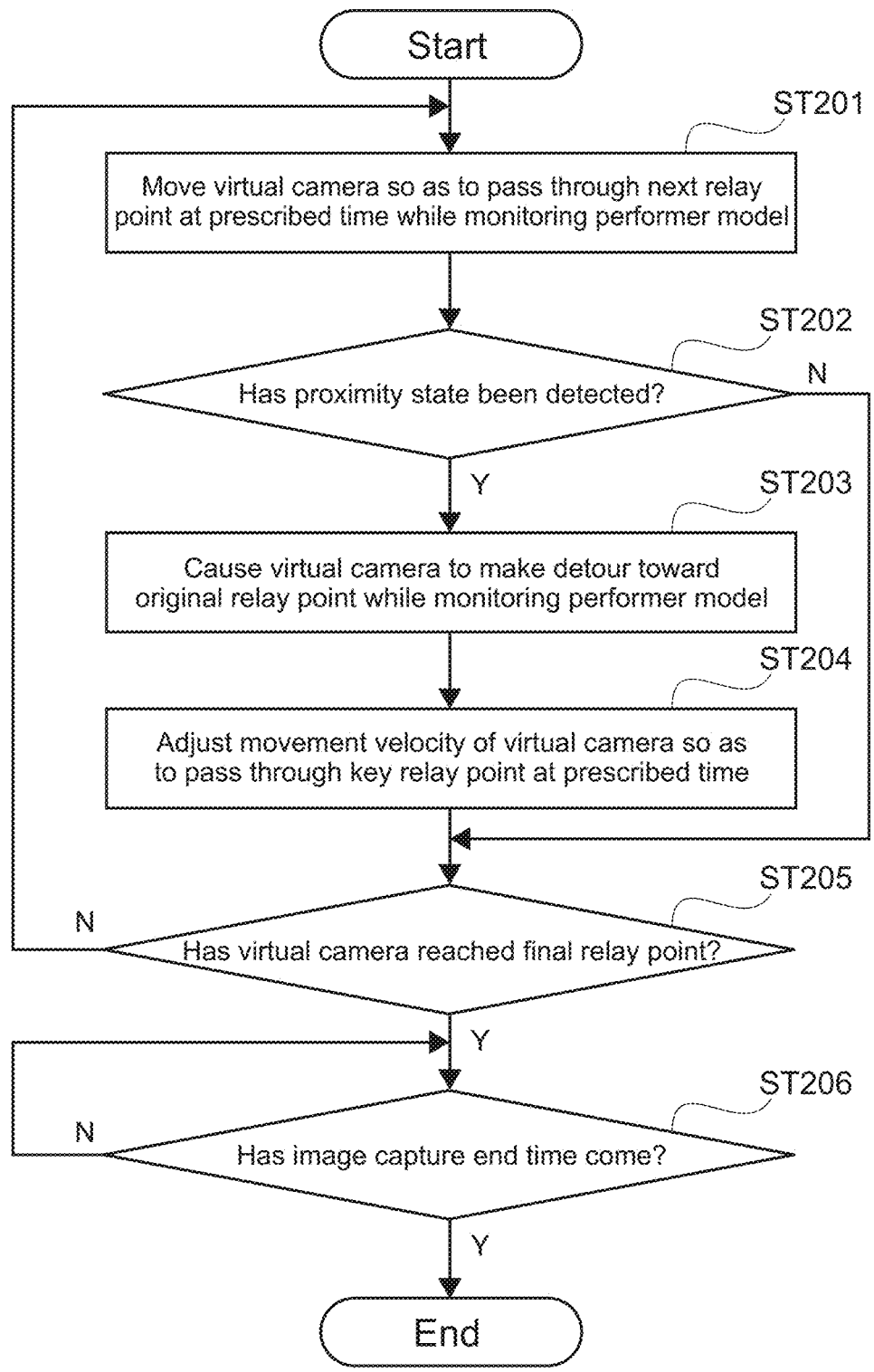
FIG. 13 A flowchart of the collision avoidance process shown in FIG. 12.

FIG. 13 is a flowchart of the collision avoidance process shown in FIG. 12.

First of all, the virtual camera 20 is moved so as to pass through the next relay point at the prescribed time while monitoring the performer model 4 (Step 201). Subsequently, whether or not the positional relationship between the performer model 4 and the virtual camera 20 is the proximity state is determined (Step 202).

In a case where the proximity state has not been detected (No in Step 202), Step 205 to be described later is performed.

In a case where the proximity state has been detected (Yes in Step 202), the virtual camera control unit 44 monitors the performer model 4 and causes the virtual camera 20 to make a detour toward the original relay point on the basis of a result of the monitoring (Step 203).

The movement position of the virtual camera 20 is adjusted, for example, so that the relative distance between the performer model 4 and the virtual camera 20 is constant in the detour. Moreover, the movement direction of the virtual camera 20 is controlled to return to the original image capture path 21. In addition, any method may be used for making a detour around the performer model 4.

The movement velocity of the virtual camera 20 is adjusted so as to pass through the key relay point at the prescribed time (Step 204).

For example, in accordance with the detour method, the amount of increase/decrease in movement distance of the virtual camera 20 is estimated. Here, for example, the amount of increase/decrease in movement distance in a case where the virtual camera 20 has been moved with the relative distance from the performer model 4 kept constant assuming that the performer model 4 does not move is calculated. A movement velocity required for passing through the relay point that is the destination at the prescribed time is set by calculating it backwards on the basis of such an estimation result. Further, for example, in a case where the movement distance changes depending on movement of the performer model 4, the movement velocity may be adjusted every time it happens.

When the movement velocity has been adjusted, whether or not the virtual camera 20 has reached the final relay point is determined (Step 205). In a case where the virtual camera 20 has not reached the final relay point (No in Step 205), the processing of Step 201 and the steps after Step 201 is performed again. In a case where the virtual camera 20 has reached the final relay point (Yes in Step 205), whether or not the image capture end time has come is determined (Step 206). In a case where the image capture end time has not come (No in Step 206), the image capture from the final relay point is continued. In a case where the image capture end time has come (Yes in Step 206), the image capture by the virtual camera 20 ends and the live relay is finished.

Hereinabove, the collision avoidance process used for in a case where the virtual camera 20 moves along the preset image capture path 21 has been mainly described. Even in a case where such an image capture path 21 is not determined, controlling the behavior of the virtual camera 20 as appropriate can avoid a collision with the performer model 4.

Hereinafter, a method of controlling the virtual camera 20 that tracks the performer model 4 and performs image capture will be described.

Figure 14:
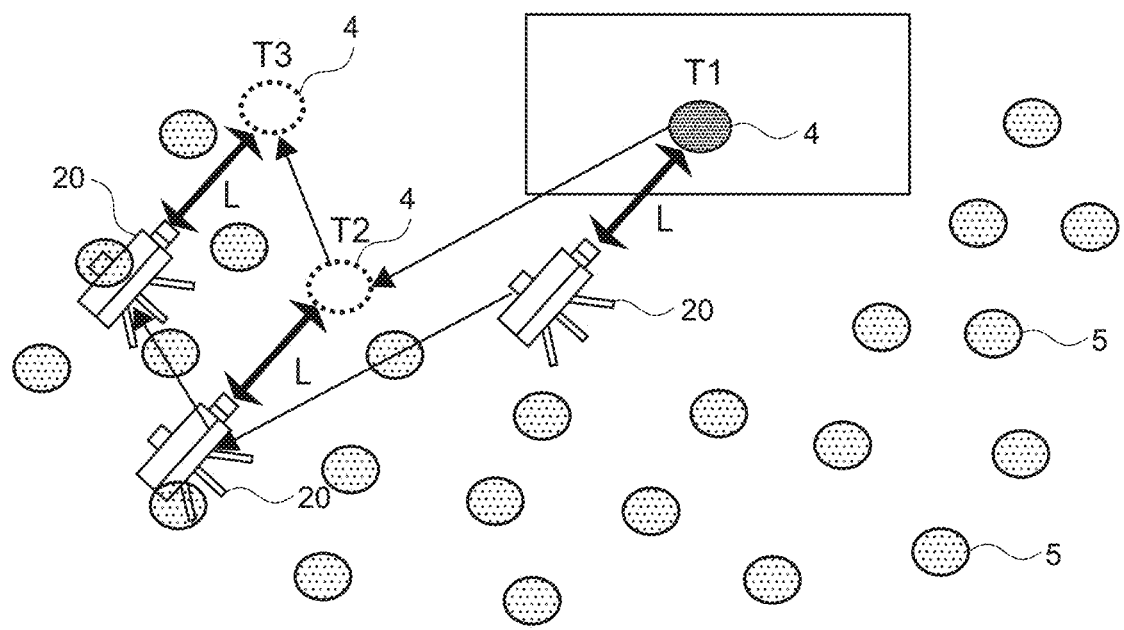
FIG. 14 A schematic view showing another example of a collision avoidance process for the virtual camera.

FIG. 14 is a collision avoidance process for the virtual camera. FIG. 14 schematically shows a state of image capture by the virtual camera 20 that tracks the performer model 4 in accordance with movement of the performer model 4 in the virtual space 3.

In the virtual space 3, the performer model 4 and the plurality of viewer models 5 are arranged. The performer model 4 is freely movable in the virtual space 3. Moreover, the viewer models 5 are arranged to surround a stage (rectangular area in the figure) provided in the virtual space 3.

In the example shown in FIG. 14, the virtual camera control unit 44 moves the virtual camera 20 so that the relative distance between the performer model 4 and the virtual camera 20 is constant as the collision avoidance process. That is, the movement of the virtual camera 20 is controlled so that a relative distance of the virtual camera 20 to the performer model 4 is kept a constant distance L (e.g., 2m, and the like).

This collision avoidance process includes the following processes.

A monitoring process of monitoring the trajectory of the virtual camera 20 in real time and calculating a relative distance in a manner that depends on the positional relationship between the performer model 4 and the virtual camera 20.

A tracking process of moving the virtual camera 20 so that the relative distance becomes the constant distance L (image capture distance), tracking the performer model 4, and performing image capture.

In the monitoring process, the relative distance between the performer model 4 and the virtual camera 20 is constantly calculated. The position of the performer model 4 that changes depending on movement of the performer 1, direction, and the like, for example, and the position of the virtual camera 20 are read, and a relative distance is calculated.

In the tracking process, position and direction for moving the virtual camera 20 are calculated so that the relative distance calculated in the monitoring process becomes the distance L, and the virtual camera 20 is moved in accordance with a result of the calculation.

For example, there is a possibility that the relative distance temporarily exceeds the distance L due to movement of the performer model 4. In this case, the virtual camera 20 is moved closer to the performer model 4 until the relative distance becomes the distance L. Also, in a case where the relative distance is temporarily smaller than the distance L, the virtual camera 20 is moved away from the performer model 4 until the relative distance becomes the distance L.

That is, it can also be said that based on the position of the performer model 4, the virtual camera control unit 44 performs feed-back control to keep the relative distance between the performer model 4 and the virtual camera 20 the distance L.

Thus, in the collision avoidance process shown in FIG. 14, not employing the predetermined image capture path 21 for the relay points, the virtual camera 20 is moved so as to track the performer model 4 while keeping a certain constant distance L from the performer model 4, and images of the performer model 4 are captured. Accordingly, a collision between the performer model 4 and the virtual camera 20 is avoided, and stable close-up shooting can be continued.

It should be noted that the direction and the like in which the virtual camera 20 captures images of the performer model 4 are not limited. For example, the virtual camera 20 is moved in accordance with the attitude of the performer model 4 so as to capture images of the performer model 4 from the front. Alternatively, the virtual camera 20 may be controlled to freely move around the performer model 4 within such a range that the relative distance becomes the distance L for example.

Further, for the avatars (viewer models 5) other than the performer model 4, "sinking" and "penetrating" of the virtual camera 20 are allowed.

For example, regarding the viewer models 5 with which the virtual camera 20 comes into contact, the data that configures the models is removed not to enter the image capture range of the virtual camera 20. That is, the viewer models 5 with which the virtual camera 20 comes into contact are handled as those not captured by the virtual camera 20.

Accordingly, images of the performer model 4 are properly captured. Moreover, since the movement range of the virtual camera 20 is not limited, it becomes possible to easily realize image capture and the like which are difficult in the real space.

It should be noted that "sinking" and "penetrating" of the virtual camera 20 into/through the viewer models 5 can also be voluntarily expressed with silhouettes or the like.

In the example shown in FIG. 14, the performer model 4 located on the stage at the time T1 leaves the stage and moves in an area in which the viewer models 5 are arranged at the time T2 and the time T3. The virtual camera 20 is moved in accordance with the performer model 4 and tracks and captures an image of the performer model 4 from a position spaced apart from it by the constant distance L. At this time, the viewer models 5 with which the virtual camera 20 comes into contact are handled as those not captured by the virtual camera 20.

Accordingly, it becomes possible to properly take a close-up shot of even performance (fan service or the like) given outside the stage.

Figure 15:
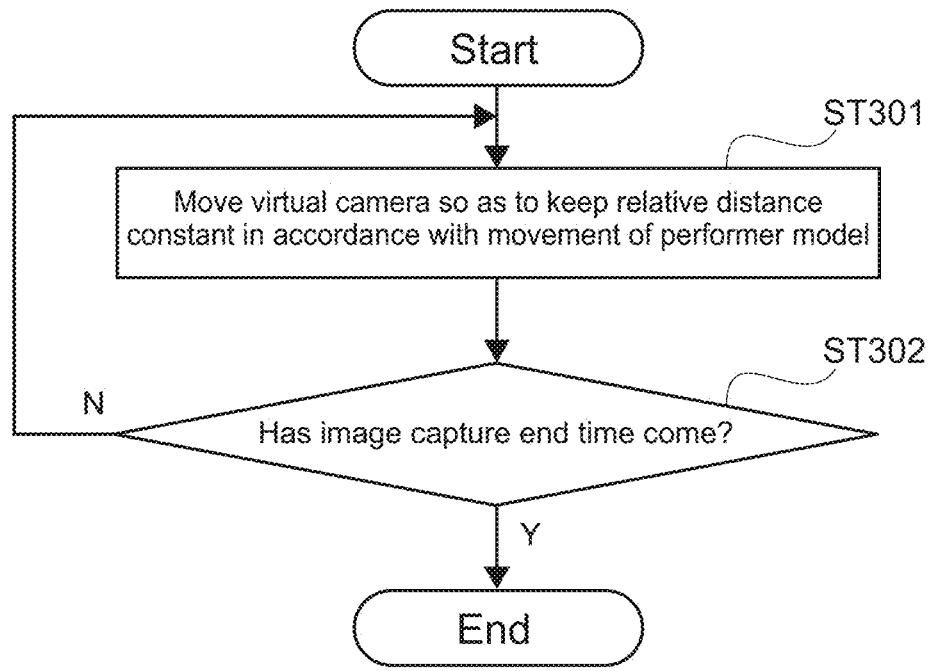
FIG. 15 A flowchart of the collision avoidance process shown in FIG. 14.

FIG. 15 is a flowchart of the collision avoidance process shown in FIG. 14.

In accordance with the movement of the performer model 4, the virtual camera 20 is moved so as to keep the relative distance the constant distance L (Step 301). For example, the current positions of the performer model 4 and the virtual camera 20 are read and a relative distance is calculated (monitoring process). Position and direction in which the virtual camera 20 moves are calculated so that this relative distance becomes the distance L, and the virtual camera 20 is moved on the basis of a result of the calculation (tracking process).

Subsequently, whether or not the image capture end time has come is determined (Step 302). In a case where the image capture end time has not come (No in Step 302), Step 301 is performed again. In a case where the image capture end time has come (Yes in Step 302), the image capture by the virtual camera 20 ends and the live relay is finished. In this manner, the tracking process (monitoring process) is continued until the image capture end time comes.

As the tracking process, control to reduce the velocity of the virtual camera 20 or stop the virtual camera 20 for avoiding a collision and perform tracking again after the virtual camera 20 is spaced away by the constant distance may be performed.

For example, when the moving performer model 4 stops suddenly, the virtual camera 20 is gradually reduced in velocity and stopped at a position at which a collision will not occur. At this time, the relative distance between the performer model 4 and the virtual camera 20 may be smaller than the distance L.

Moreover, for example, when the performer model 4 that has stopped starts to move again, tracking by the virtual camera 20 is started after waiting for the performer model 4 to move away from the virtual camera 20 by the constant distance (e.g., the distance L) as the relative distance.

It can be said that it is a process of moving the virtual camera 20 with the change timing for changing the velocity of the virtual camera 20 deviated from the timing for changing the velocity of the performer model 4. That is, the virtual camera control unit 44 delays the velocity change timing of the virtual camera 20 from the velocity change timing of the performer model 4 so that the relative distance falls within a predetermined range.

Accordingly, it becomes possible to realize camera work in which the image capture distance dynamically changes when the performer model 4 starts to move or stops. As a result, it becomes possible to show a dynamic motion of the performer model 4 (performer 1).

In addition, the method of tracking and capturing images of the performer model 4 is not limited, and any tracking method that can avoid a collision between the performer model 4 and the virtual camera 20 may be used.

As described above, in the server control unit 42 according to the present embodiment, the collision avoidance process depending on the positional relationship between the performer model 4 in the virtual space 3 and the virtual camera 20 that captures images of the performer model 4 while moving in the virtual space 3 is performed. Accordingly, a collision between the performer model 4 and the virtual camera 20 is previously avoided, and images of the performer model 4 are properly captured in the virtual space 3.

In a case of taking a close-up shot with a virtual camera located in proximity to an image capture target in live streaming or the like using a virtual space, there is a possibility that a collision between the image capture target and the virtual camera occurs.

Figure 16:
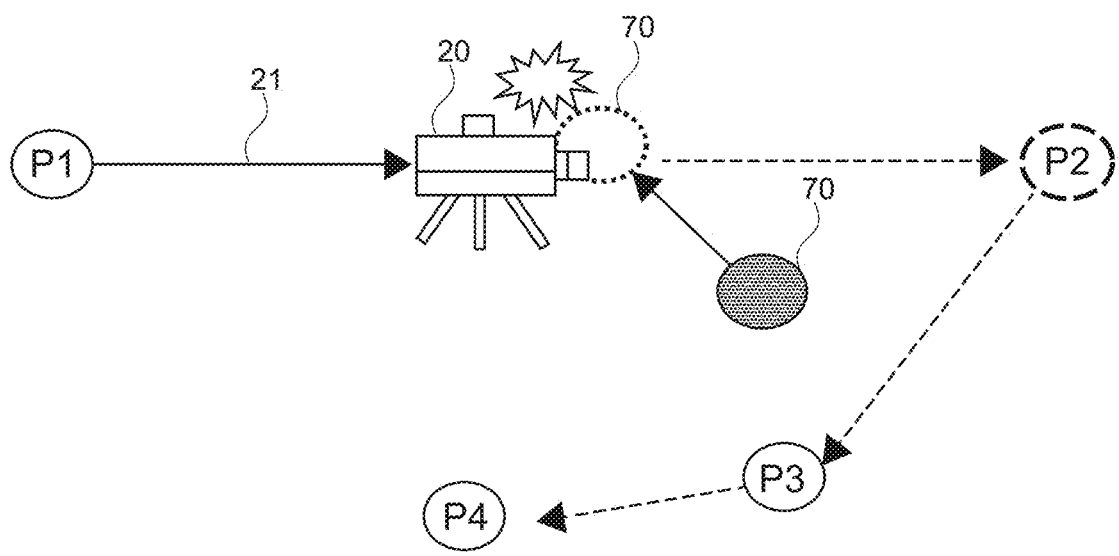
FIG. 16 A schematic view showing a collision example between an image capture target and a virtual camera.

FIG. 16 is a schematic view showing a collision example between the image capture target and the virtual camera. In FIG. 16, the image capture path 21 (P1 to P4) for taking a close-up shot with the virtual camera 20 located in proximity to an image capture target 70 is set. At this time, when the image capture target 70 moves and overlaps the image capture path 21, there is a possibility that the virtual camera 20 collides with the image capture target 70, a sinking video or penetrating video is captured, and a broadcast accident occurs.

In the present embodiment, the collision avoidance process depending on the positional relationship between the performer model 4 that is the image capture target and the virtual camera 20 is performed. The collision avoidance process is, for example, a process of monitoring the position of the performer model 4 and controlling the movement of the virtual camera 20 to prevent the virtual camera 20 from being too close to the performer model 4.

For example, as described above with reference to FIGS. 10, 12, and the like, in a case where the image capture path 21 of the virtual camera 20 is preset, a proximity state of the performer model 4 and the virtual camera 20 is detected and the image capture path 21 is changed. Further, as described above with reference to FIG. 14 and the like, in a case where the image capture path 21 or the like is not set, the virtual camera 20 is moved to track the performer model 4 at the constant distance L.

Performing such a process can previously avoid the situation where the virtual camera 20 collides against the performer model 4 irrespective of the behavior of the performer model 4. Accordingly, the performance of the performer model 4 (performer 1) can be live-streamed without causing a broadcast accident such as a sinking video and a penetrating video.

It is conceivable that services of streaming interactive and real-time live content using volumetric models of performers 1 in the real space will be spread in the future. Also in such a case, the use of the present technology can stream a high-quality live image in which a collision of a virtual camera 20 against a performer model 4 and the like are avoided.

Other Embodiments

The present technology is not limited to the above-mentioned embodiments, and various other embodiments can be made.

In FIGS. 10 and 12, the collision avoidance process of changing the image capture path for the virtual camera for avoiding a collision with the performer model has been mainly described. The present technology is not limited thereto, and for example, a process of controlling the movement velocity of the virtual camera for avoiding a collision may be performed.

For example, in a case where the proximity state has been detected, the virtual camera is reduced in velocity or stopped without changing the path for the virtual camera. Moreover, when the performer model moves and the proximity state is cancelled, the velocity of the virtual camera is increased depending on the time of passage through the relay point and the like. Further, it is also possible to perform a process of changing the image capture path when the performer model does not move and the proximity state continues for a certain time.

Hereinabove, the case of capturing images of the performer model with the single virtual camera has been described. For example, with a plurality of virtual cameras, images of the performer model may be captured. In this case, each of the virtual cameras is controlled to move the different trajectory (image capture path). Moreover, a display image for displaying the performer model is selected from images (videos) captured by the respective virtual cameras. Here, the display image is, for example, an image that is finally displayed on each client terminal.

Thus, in the configuration in which the plurality of virtual cameras is used, in a case where the proximity state has been detected, a process of switching the display image for displaying the performer model from an image captured by a virtual camera to an image captured by another virtual camera is performed as the collision avoidance process.

For example, it is assumed that the proximity state has been detected with respect to the virtual camera that captures the display image. In this case, the display image is switched to an image of another virtual camera that is not in the proximity state. In this manner, the process of switching the virtual camera to prevent an image of a moment when the virtual camera collides from being streamed is also included in the collision avoidance process in the present disclosure.

Accordingly, a natural live video can be streamed without causing a broadcast accident.

Hereinabove, the collision avoidance process for the virtual camera has been described exemplifying the case where the image capture target of the virtual camera is the actually photographed 3D model (volumetric model) of the performer. The present technology can be applied regardless of the kind of image capture target.

For example, the image capture target of the virtual camera may be a CG 3D model. The virtual camera captures images of, for example, a three-dimensional CG model (virtual avatar) that moves along with movement of the performer. Also in such a case, the use of the above-mentioned method can sufficiently avoid a collision between the virtual camera and the CG model.

Further, the case of capturing images of the live performance of the music live concert or the like in the virtual space has been described above.

The present technology is not limited thereto, and the present technology can also be applied in a case of streaming entertainment content such as "sports live" and "variety show". For example, on the basis of data obtained by capturing an image of a sports game played in a real space, a sports stadium is reproduced in the virtual space. Accordingly, free-viewpoint image capture by virtual cameras with respect to the sports stadium can be performed. In such a case, the above-mentioned collision avoidance process is applied in order to avoid a collision between players and the virtual cameras.

Further, in a case of streaming content in fields such as "remote education", "remote lesson", and "remote work support", the present technology may be applied. For example, on the basis of data obtained by a robot or the like capturing an image of a work space where remote work is done, the work space is reproduced in the virtual space. In this case, the virtual camera is moved to avoid a collision with the robot.

Accordingly, it becomes possible to steadily monitor the work space, and it becomes possible to sufficiently support the remote work.

Hereinabove, the case where images captured by the virtual camera is live-streamed has been mainly described. The present technology is not limited thereto, and the present technology can also be applied in a case of generating content on the basis of data in which performance in a virtual space is recorded for example.

For example, in a case of generating a live video after a live concert (e.g., in a case where a content production company is different from a company of photography and edition for the content), the music live concert that has already taken place is reproduced and image capture by a virtual camera is performed on the basis of data about a music live concert or the like that has taken place in the virtual space. In this case, the use of the present technology can easily generate a route for the virtual camera to avoid a collision of the virtual camera with the performer model.

Thus, the present technology functions as a path generation tool for the virtual camera or a design support tool for the image capture path.

At least two features of the features according to the present technology, which have been described above, may be combined. That is, the various features described in the respective embodiments may be arbitrarily combined across the respective embodiments. Moreover, the above-mentioned various effects are merely exemplary and not limitative, and other effects may be provided.

In the present disclosure, the "same", "equal", "orthogonal", and the like are concepts including "substantially the same", "substantially equal", "substantially orthogonal", and the like. For example, states included in a predetermined range (e.g., ±10% range) using "completely the same", "completely equal", "completely orthogonal", and the like as the bases are also included.

It should be noted that the present technology can also take the following configurations.

(1) An information processing apparatus, including
an image capture control unit that performs, depending on a positional relationship between a target object that moves in a virtual space and a virtual camera that moves in the virtual space and captures an image of a target object, a collision avoidance process for avoiding a collision of the virtual camera against the target object.

(2) The information processing apparatus according to (1), in which
the image capture control unit detects, on the basis of the positional relationship between the target object and the virtual camera, a proximity state of the target object and the virtual camera, and performs the collision avoidance process in a case where the proximity state has been detected.

(3) The information processing apparatus according to (2), in which
the image capture control unit detects a state in which a relative distance between the target object and the virtual camera is equal to or smaller than the predetermined threshold as the proximity state.

(4) The information processing apparatus according to (3), in which
the relative distance includes a current value or a predicted value.

(5) The information processing apparatus according to any one of (2) to (4), in which
the virtual camera images the target object along a preset image capture path, and
the image capture control unit changes, in a case where the proximity state has been detected, the image capture path as the collision avoidance process.

(6) The information processing apparatus according to (5), in which
the image capture path is a path set so that the virtual camera passes through a plurality of relay points in order.

(7) The information processing apparatus according to (6), in which
the image capture control unit changes, in a case where the proximity state has been detected, a relay point that is a movement destination of the virtual camera so that a collision between the target object and the virtual camera is avoided.

(8) The information processing apparatus according to (7), in which
the image capture control unit sets the movement destination of the virtual camera to be a relay point smallest in the order that enables a collision between the target object and the virtual camera to be avoided.

(9) The information processing apparatus according to any one of (6) to (8), in which the image capture control unit changes, in a case where the proximity state has been detected, at least a part of a path up to the relay point that is the movement destination of the virtual camera so that a collision between the target object and the virtual camera is avoided.

(10) The information processing apparatus according to (9), in which
the image capture control unit moves the virtual camera along an alternative path to make a detour around the target object from the point at which the proximity state has been detected.

(11) The information processing apparatus according to (10), in which
the alternative path is a path that keeps the relative distance between the target object and the virtual camera constant.

(12) The information processing apparatus according to any one of (6) to (11), in which
the image capture path is a path to which a time of passage of the virtual camera is set for each of the plurality of relay points, and
the image capture control unit adjusts, on the basis of the time of passage set for the relay point, a movement velocity of the virtual camera that moves the changed image capture path.

(13) The information processing apparatus according to (12), in which
the plurality of relay points includes at least one key relay point, and
the image capture control unit adjusts the movement velocity of the virtual camera in a manner that depends on a time of passage through the key relay point included in the changed image capture path.

(14) The information processing apparatus according to any one of (2) to (13), in which
the image capture control unit switches, in a case where the proximity state has been detected, a display image for displaying the target object from the image captured by the virtual camera to an image captured by another virtual camera as the collision avoidance process.

(15) The information processing apparatus according to any one of (1) to (14), in which
the image capture control unit moves the virtual camera so that the relative distance between the target object and the virtual camera is constant as the collision avoidance process.

(16) The information processing apparatus according to (15), in which
the image capture control unit retards a timing of velocity change of the virtual camera with respect to a timing of velocity change of the target object so that the relative distance falls within a predetermined range.

(17) The information processing apparatus according to any one of (1) to (16), in which
the target object includes a three-dimensional actually photographed model of a performer.

(18) The information processing apparatus according to any one of (1) to (17), in which
the image capture control unit streams the image captured by the virtual camera in real time.

(19) An information processing method, including by a computer system
performing, depending on a positional relationship between a target object that moves in a virtual space and a virtual camera that moves in the virtual space and captures an image of a target object, a collision avoidance process for avoiding a collision of the virtual camera against the target object.

(20) A display apparatus, including:
an image acquiring unit that acquires an image captured by a virtual camera that operates in accordance with a collision avoidance process for avoiding a collision of the virtual camera against a target object, the collision avoidance process being performed depending on a positional relationship between the target object that moves in a virtual space and the virtual camera that moves in the virtual space and captures an image of the target object; and
a display unit that displays the image captured by the virtual camera.

REFERENCE SIGNS LIST 1 performer
2 viewers
3 virtual space
4 performer model
5 viewer model
10 streaming server
12 client terminal
14 HMD
20 virtual camera
21 image capture path
22 video of the virtual camera
23 alternative path
40 network transmission unit
41 storage unit
42 server control unit
43 content data generating unit
46 viewer model generating unit
100 streaming system

The invention claimed is:

1. An information processing apparatus, comprising:
circuitry configured to
detect, based on a positional relationship between a target object that moves in a virtual space and a virtual camera that moves in the virtual space and images the target object, a proximity state of the target object and the virtual camera, and
perform, depending on the positional relationship between the target object and the virtual camera indicating that the proximity state has been detected, a collision avoidance process for avoiding a collision of the virtual camera against the target object,
wherein the collision avoidance process changes an image capture path of the virtual camera,
wherein the virtual camera initially images the target object along a preset image capture path,
wherein the circuitry performs the collision avoidance process by changing to a different image capture path from the preset image capture path in a case where the proximity state has been detected, and
wherein each image capture path is a path set so that the virtual camera passes through a plurality of relay points in order.

2. The information processing apparatus according to claim 1,
wherein the circuitry detects the proximity state as a state in which a relative distance between the target object and the virtual camera is equal to or smaller than a predetermined threshold.

3. The information processing apparatus according to claim 2,
wherein the relative distance includes a current value or a predicted value.

4. The information processing apparatus according to claim 1,
wherein the circuitry changes the image capture path by changing, in the case where the proximity state has been detected, a relay point that is a movement destination of the virtual camera so that the collision between the target object and the virtual camera is avoided.

5. The information processing apparatus according to claim 4,
wherein the circuitry is further configured to set the movement destination of the virtual camera to be a relay point smallest in the order that enables the collision between the target object and the virtual camera to be avoided.

6. The information processing apparatus according to claim 4,
wherein the circuitry changes, in a case where the proximity state has been detected, at least a part of a path up to the relay point that is the movement destination of the virtual camera so that the collision between the target object and the virtual camera is avoided.

7. The information processing apparatus according to claim 6,
wherein the circuitry changes the image capture path by moving the virtual camera along an alternative path to make a detour around the target object from a point at which the proximity state has been detected.

8. The information processing apparatus according to claim 7,
wherein the alternative path is a path that keeps a relative distance between the target object and the virtual camera constant.

9. The information processing apparatus according to claim 1,
wherein each image capture path is a path to which a time of passage of the virtual camera is set for each of the plurality of relay points, and
wherein the circuitry performs the collision avoidance process by adjusting, on a basis of the time of passage set for the relay point, a movement velocity of the virtual camera that moves the changed image capture path.

10. The information processing apparatus according to claim 9,
wherein the plurality of relay points includes at least one key relay point, and
wherein the circuitry adjusts the movement velocity of the virtual camera in a manner that depends on a time of passage through the key relay point included in the changed image capture path.

11. The information processing apparatus according to claim 1,
wherein the circuitry performs the collision avoidance process by switching, in a case where the proximity state has been detected, a display image for displaying the target object from the image captured by the virtual camera to an image captured by another virtual camera.

12. The information processing apparatus according to claim 1,
wherein the circuitry performs the collision avoidance process by moving the virtual camera so that a relative distance between the target object and the virtual camera is constant.

13. The information processing apparatus according to claim 12,
wherein the circuitry is further configured to retard a timing of velocity change of the virtual camera with respect to a timing of velocity change of the target object so that the relative distance falls within a predetermined range.

14. The information processing apparatus according to claim 1,
wherein the target object includes a three-dimensional actually photographed model of a performer.

15. The information processing apparatus according to claim 1,
wherein the circuitry is further configured to stream the image captured by the virtual camera in real time.

16. An information processing method, comprising by a computer system:
detecting, based on a positional relationship between a target object that moves in a virtual space and a virtual camera that moves in the virtual space and images the target object, a proximity state of the target object and the virtual camera; and
performing, depending on the positional relationship between the target object and the virtual camera indicating that the proximity state has been detected, a collision avoidance process for avoiding a collision of the virtual camera against the target object,
wherein the collision avoidance process changes an image capture path of the virtual camera,
wherein the virtual camera initially images the target object along a preset image capture path,
wherein the collision avoidance process is performed by changing to a different image capture path from the preset image capture path in a case where the proximity state has been detected, and
wherein each image capture path is a path set so that the virtual camera passes through a plurality of relay points in order.

17. A display apparatus, comprising:
circuitry configured to acquire an image captured by a virtual camera that operates in accordance with a collision avoidance process for avoiding a collision of the virtual camera against a target object, the collision avoidance process being performed depending on a positional relationship between the target object that moves in a virtual space and the virtual camera that moves in the virtual space and captures an image of the target object; and
a display configured to display the image captured by the virtual camera,
wherein the positional relationship is used to detect a proximity state of the target object and the virtual camera,
wherein the collision avoidance process is performed when the positional relationship indicates that the proximity state has been detected,
wherein the collision avoidance process changes an image capture path of the virtual camera,
wherein the virtual camera initially images the target object along a preset image capture path,
wherein the circuitry performs the collision avoidance process by changing to a different image capture path from the preset image capture path in a case where the proximity state has been detected, and
wherein each image capture path is a path set so that the virtual camera passes through a plurality of relay points in order.

* * * * *